United States Patent
Orler

(10) Patent No.: US 10,626,030 B2
(45) Date of Patent: Apr. 21, 2020

(54) ELECTROMAGNETIC FLUID SEPARATION AND COMBINATION

(71) Applicant: Anthony J. Orler, San Francisco, CA (US)

(72) Inventor: Anthony J. Orler, San Francisco, CA (US)

( * ) Notice: Subject to any disclaimer, the term of this patent is extended or adjusted under 35 U.S.C. 154(b) by 0 days.

(21) Appl. No.: 16/269,991

(22) Filed: Feb. 7, 2019

(65) Prior Publication Data

US 2019/0241448 A1    Aug. 8, 2019

Related U.S. Application Data

(60) Provisional application No. 62/627,668, filed on Feb. 7, 2018.

(51) Int. Cl.
| | |
|---|---|
| *B03C 1/30* | (2006.01) |
| *B03C 1/32* | (2006.01) |
| *B03C 3/02* | (2006.01) |
| *C02F 1/48* | (2006.01) |
| *C02F 1/00* | (2006.01) |

(52) U.S. Cl.
CPC ............. *C02F 1/484* (2013.01); *B03C 1/32* (2013.01); *B03C 3/02* (2013.01); *C02F 1/001* (2013.01); *C02F 1/485* (2013.01); *B03C 2201/18* (2013.01); *C02F 2201/483* (2013.01)

(58) Field of Classification Search
CPC .... C02F 1/484; C02F 1/001; C02F 2201/483; C02F 1/485; C02F 1/46104; C02F 1/463; C02F 2201/4611; C02F 1/46114; C02F 1/465; C02F 1/4672; C02F 1/487; C02F 1/48; C02F 1/705; C02F 1/00; B03C 3/02; B03C 1/32; B03C 2201/18
USPC ................................................ 210/222, 223
See application file for complete search history.

(56) References Cited

U.S. PATENT DOCUMENTS

| | | | | |
|---|---|---|---|---|
| 2,607,492 | A * | 8/1952 | Anders | B03C 1/28 210/222 |
| 6,821,403 | B1 * | 11/2004 | Lundquist | C02F 1/46104 204/157.15 |
| 2007/0051685 | A1 * | 3/2007 | Wittmer | C02F 1/484 210/695 |
| 2007/0131621 | A1 * | 6/2007 | Denton | C02F 1/463 210/695 |

* cited by examiner

*Primary Examiner* — Nam X Nguyen
*Assistant Examiner* — Ekandra S. Miller-Cruz
(74) *Attorney, Agent, or Firm* — Anthony J. Orler

(57) ABSTRACT

Electromagnetic processing of fluid materials is disclosed. Separation of one or more ionic components of a fluid, and combination of one or more ionic components in a fluid, are discussed.

11 Claims, 14 Drawing Sheets

ELECTROMAGNETIC FUNNEL

FIELD LINES ARE ALWAYS
PERPENDICULAR TO
EQUIPOTENTIAL LINES

EQUIPOTENTIAL LINES
DASHED AND/OR IN RED

ELECTROMAGNETIC FUNNEL

ELECTROMAGNETIC FLUID SEPARATION AND COMBINATION

CROSS-REFERENCE TO RELATED APPLICATIONS

The present disclosure claims the benefit under 35 U.S.C. 119(e) of U.S. Provisional Patent Application No. 62/627,668, filed 7 Feb. 2018 by Anthony James Orler and entitled "ELECTROMAGNETIC FLUID SEPARATION AND COMBINATION", which application is incorporated by reference herein in its entirety.

BACKGROUND

Field

Aspects of the present disclosure generally relate to fluid processing, and more specifically electromagnetic fluid separation and combination.

Background

Fluid processing is employed in many fields. Desalination, chemical processing, and wastewater treatment, geothermal power generation, oilfield production, etc., all employ fluid processing to some degree. Most fluid processing is done either mechanically or chemically. Chemical fluid processing may be done by adding other chemicals to the fluid to precipitate out dissolved solids in the fluid, change the acidity/alkalinity (also known as "pH") of the fluid, etc., to remove or add constituents to the fluid as needed to produce a desired fluid output and/or solid output. Mechanical fluid processing may be done by agitating the fluid, heating or cooling the fluid, filtering the fluid, etc.

Chemical and/or mechanical fluid processing, however, requires the fluid processor to expend money for additives, power to move the fluid through the processing plant and/or agitate the fluid, provide storage and/or other tanks for the fluid to be processed in, etc. Such expenditures add to the cost of production, costs of constructing and/or maintaining the processing plant, etc., which may make it financially unfeasible for some fluids to be processed.

SUMMARY

Aspects of the present disclosure comprise electromagnetic processing of fluids.

In an aspect of the present disclosure, a fluid is exposed to an electromagnetic field which may assist in separating some ions present in the fluid from other ions present in the fluid. In another aspect of the present disclosure, a fluid may be exposed to an electromagnetic field which may concentrate ions in a portion of the overall volume of the fluid. The concentrated portion may then be separated from the remaining fluid.

In another aspect of the present disclosure, a fluid control device may include an electromagnetic field generating device, externally coupled to a first conduit, in which the electromagnetic field generating device creates an electromagnetic field within the first conduit such that ions within a fluid in the outer conduit are affected by the electromagnetic field.

In such an aspect of the present disclosure, the fluid control device may further include a separation device, coupled to the first conduit, in which the electromagnetic field moves the ions in the fluid flowing in the first conduit toward the separation device. The fluid control device may also optionally include the separation device being coupled to the outer conduit such that the electromagnetic field concentrates the ions in the fluid at an entrance of the separation device. The fluid control device may include an inner conduit as the separation device. The fluid control device of claim 4 may employ a coiled wire as the electromagnetic field generating device, such that the coiled wire is coiled around an outside of the first conduit.

The fluid control device may include the coiled wire being electrically insulated from the first conduit, and the entrance of the separation device may encompass an axial center of the coiled wire and/or be located between a first turn of the coiled wire that is coiled around the outside of the first conduit and a last turn of the coiled wire that is coiled around the outside of the first conduit.

In another aspect of the present disclosure, the fluid control device may include a capacitive device coupled around the outside of the first conduit as the electromagnetic field generating device. In such an aspect, the capacitive device may be electrically insulated from the first conduit, and the entrance of the separation device may encompass an axial center of the capacitive device. The fluid control device may also include the feature of the entrance of the separation device being located between a first plate of the capacitive device that is coupled around the outside of the first conduit and a second plate of the capacitive device that is coupled around the outside of the first conduit.

In another aspect of the present disclosure, a method for selectively moving ions in a fluid may include flowing the fluid in a first conduit, exposing the fluid flowing in the first conduit to an electromagnetic field, wherein the electromagnetic field is generated external to the first conduit, adjusting the electromagnetic field to selectively affect at least one ion in the fluid flowing in the first conduit, and dividing the first conduit into at least a first portion and a second portion, in which the electromagnetic field affects the at least one ion such that the at least one ion flows into a desired one of the first portion and the second portion.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further purposes and advantages, will be better understood from the following description when considered in connection with the accompanying figures. It is to be expressly understood, however, that each of the figures is provided for the purposes of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Overview

In an aspect of the present disclosure, a fluid is exposed to an electromagnetic field which may assist in separating some ions present in the fluid from other ions present in the fluid. In another aspect of the present disclosure, a fluid may be exposed to an electromagnetic field which may concentrate ions in a portion of the overall volume of the fluid. The concentrated portion may then be separated from the remaining fluid.

Figure 1:
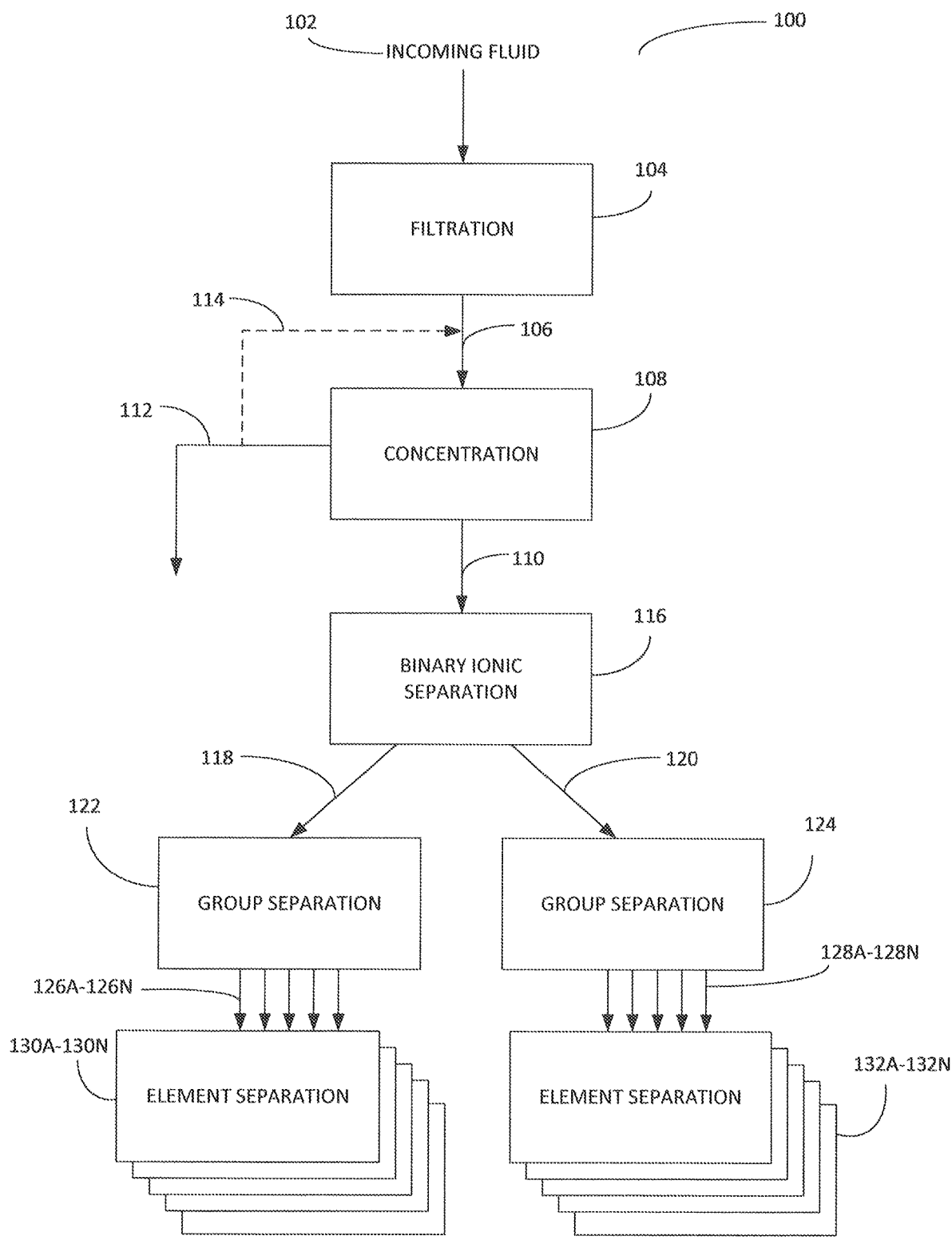
FIG. 1 illustrates a block diagram in accordance with an aspect of the present disclosure.

FIG. 1 illustrates a block diagram in accordance with an aspect of the present disclosure.

As shown in FIG. 1, incoming fluid 102 may be passed through optional filtration stage 104. Incoming fluid 102 may comprise constituents (also referred to as "ionic components" and/or "ionic particles" herein) and/or other particles randomly dispersed throughout the incoming fluid 102 volume. Filtration stage 104 removes particles that are larger than a filter pore size, e.g., 1 micron, etc., which may assist system 100 in performing the functions and/or methods described herein.

The output from filtration stage 104, namely, filtered fluid 106, may then be passed through a concentration stage 108. Concentration stage 108 may concentrate the constituents (e.g., ionic components and/or other particles present in filtered fluid 106, etc.) into a concentrated fluid 110, which has a volume that may only be a portion of the volume of filtered fluid 106. The remaining fluid 112 of filtered fluid 106 may be diverted away from the next portion of system 100. Remaining fluid 112 may be recycled into concentration stage 108 if desired via recycling path 114.

The concentrated fluid 110, having only a portion of the volume of incoming fluid 102/filtered fluid 106, is easier to process than the entire volume of incoming fluid 102/filtered fluid 106. For example, and not by way of limitation, incoming fluid 102 may be entering system 100 at 6000 gallons per minute (gpm), with concentrations of various elements/ions/particles in the parts per million (ppm) or parts per billion (ppb) ranges. By concentrating the various constituents in the volume of incoming fluid 102/filtered fluid 106 into a portion of the 6000 gallons per minute, e.g., 600 gallons per minute, 60 gallons per minute, etc., the processing of the various elements/ions/particles in system 100, or in any system, may be simpler, more efficient, less expensive, and/or may have other advantages.

Concentration of incoming fluid 102 into concentrated fluid 110 may cause some of the constituents dissolved in concentrated fluid 110 to be present in concentrations above their saturation points in the smaller volume of concentrated fluid 110. As such, determination of the temperature, pressure, solvent, and/or solute characteristics and/or concentrations may be used to determine how much concentration of incoming fluid 102 into concentrated fluid 110 may be performed without deleterious effect on system 100 and/or precipitation of constituents during concentration of the constituents from incoming fluid 102 to concentrated fluid 110. For some constituents in fluid 102, an initial separation of one or more constituents may be performed prior to concentration, which is discussed with respect to FIG. 10.

Concentrated fluid 110 may then be passed to a binary ionic separation stage 116. Binary ionic separation stage 116 separates positive ions in concentrated fluid 110 from negative ions in concentrated fluid 110. Positive ions, which are still dissolved in concentrated fluid 110, are then passed from concentration stage 116 as fluid 118, and negative ions, which are still dissolved in concentrated fluid 110, are then passed from concentration stage 116 as fluid 120.

Each of fluids 118 and 120 comprise a solvent fluid and various ions still dissolved in solution; fluid 118 comprises one polarity (e.g., positive) of ions, while fluid 120 comprises the other polarity (e.g., negative) of ions. However, fluid 118 may comprise ions within various periodic groups, e.g., group 1, group 2, etc. (i.e., columns) within the periodic table. As such, ions having a plus 1 (+1) charge, e.g., lithium, potassium, sodium, etc., (e.g., elements with a single electron in their outer orbital shell) may be mixed with ions having a +2 charge, e.g., magnesium, calcium, etc., and ions having +3, +4, +5 charges, etc. Similarly, fluid 120 may comprise ions of various periodic groups where the ions present each have a negative charge of various intensity, e.g., −1, −2, −3, etc. Group separation sections 122 and 124 separate the ions into groups, such that for fluid 118, the +1 ions are separated from the other positive ions in fluid 118, the +2 ions are separated from the other positive ions in fluid 118, etc. Similarly, for fluid 120, the −1 ions are separated from the other negative ions in fluid 120, the −2 ions are separated from the other negative ions in fluid 120, etc. Each group (+1, −1, etc.), each of which may comprise one or more types of ionic components, is output from group separation sections 122 and 124 as separate outputs, 126A-126N and 128A-128N respectively.

Each of the outputs 126 and 128 groups (i.e., +1, −1, +2, −2, etc.) may be individually sent to an element separation section 130A-130N and 132A-132N respectively. Each section 130 and 132 divides the group (e.g., the +1 ions) into individual elements (e.g., lithium from potassium, etc.) as desired within system 100, or can divide each group into separate groups of ions based on characteristics of the elements present in outputs 126 and/or 128.

Geothermal Fluid Processing

As an example, and not by way of limitation, geothermal fluids may be employed as the incoming fluid 102 in an aspect of the present disclosure. Geothermal fluids may be delivered to system 100 at temperatures between 195° C. and 250° C., and at pressures between 150 pound-force per square inch gauge (psig) and 350 psig. Psig, also known as "gauge pressure," is measured as a pressure relative to ambient atmospheric pressure instead of measuring the fluid pressure as an absolute pressure.

The potential of hydrogen, (i.e., pH) of geothermal fluids (also known as geothermal brines) is typically acidic, and is often between the values of 5 and 6.5 (where a value of 7 is considered neutral). Geothermal brines may contain a variety of dissolved solids, including lithium, sodium, potassium, iron, copper, rubidium, barium, magnesium, zinc, strontium, tin, aluminum, chlorine, calcium, manganese, antimony, lead, and/or trace amounts of other materials. Many of the more valuable solids are present in the geothermal brine in amounts of less than 1 to approximately 200 parts per million (ppm), which means that large volumes of geothermal brine must be processed to gather enough of a given material to make the extraction process financially feasible.

Many efforts have been made to extract these and other minerals from geothermal brines since at least the early 1960's, as these minerals have applications in many different fields. However, these efforts have employed chemical and/or mechanical processing, which has often been rather costly and at times inefficient. Some approaches have used chemical processing of the geothermal brines through selective precipitation of various elements using precipitants such as calcium oxide (lime), which precipitates hydroxides dissolved in the geothermal brine. Other chemical approaches bubble ("sparge") air or other gasses through the brine to create oxide that are then precipitated and filtered from the brine liquid. Other processes may use selective absorption (or adsorption) of various materials, e.g., lithium, to extract materials from the brine. These processes require large tanks and additional materials (lime, chemical additives, fluid pumps, air pumps, precise timing of fluid flow, heat, heat-resistant materials, large tanks for storage and processing, etc.) to process the geothermal brine in order to extract the materials desired.

In an aspect of the present disclosure, when a geothermal brine is employed as an incoming fluid 102, some materials, e.g., silica (silicon dioxide) may be removed from the geothermal brine in filtration stage 104 and/or may be removed by separating the silicon ions from the oxygen ions prior to these ionic components having the ability to cool and precipitate (by passing the incoming fluid 102 through a binary ionic separation stage 116 and/or group separation stage 112 before the geothermal brine cools). If a concentration stage 108 is used as an initial stage of system 100, rather than processing the 6000 gallons per minute (gpm) of the output of a geothermal wellhead, in an aspect of the present disclosure concentration stage 108 can take the 6000 gpm silica filtered brine 106 and concentrate the ionic materials into a smaller volume, e.g., 600 gpm, 60 gpm, etc.

In another aspect of the present disclosure, filtration stage 104 can be eliminated, and incoming fluid 102 can be directed into concentration stage 108 immediately, because concentration stage 108 will only concentrate ionic materials, and silicon dioxide is not ionic. Silicon dioxide contains covalent electron bonds, and as such would not be attracted or repelled by the concentration stage 108. Although a small amount of silicon dioxide may be present in concentrated fluid 110, such amounts may not be detrimental to system 100 during further processing of concentrated fluid 110. In other aspects of the present disclosure, binary ionic separation stage 116 and/or group separation stage 122 may be used as the initial stage of system 100 to separate the silicon from the oxygen present in incoming fluid 102 to reduce the ability of the silicon to precipitate during subsequent processing and/or fluid flow in system 100 (or any other system).

In another aspect of the present disclosure, filtration stage 104 may be omitted and concentration stage 106 may be exposed directly to incoming fluid 102. Because silicon dioxide is not ionic, or, at least, is not as ionic as other elements and compounds that may be present in incoming fluid 102, concentration stage 106 will not have as much of an effect on the silicon dioxide dissolved in incoming fluid as concentration stage 106 will have on the ionic compounds and/or other elements present in incoming fluid 102. Thus, concentrated fluid 110 will have a larger concentration of the ionic compounds, and either a similar or smaller concentration of silicon dioxide, as the incoming fluid 102. The majority of the silicon dioxide can then be filtered as part of fluid 112 and/or 114, and a smaller filter and/or processing stage can be used after concentration stage to filter and/or otherwise remove the silicon dioxide present in concentration fluid 110, rather than rather than providing a large filter for the remainder of system 100 after concentration stage 108, to process the remaining silicon dioxide in concentrated fluid 110.

In an aspect of the present disclosure, the volume reduction of concentrated fluid 110 versus the volume of incoming fluid 102, even without the remaining portions of system 100, may reduce the size of any chemical processing plant needed to extract minerals from the geothermal brine. For example, and not by way of limitation, if concentration stage 108 can reduce the volume of fluid to be processed from 6000 gpm to 600 gpm, the size of storage tanks, facilities, etc., also are reduced because the resultant plant is only processing one-tenth of the volume of fluid. Further, because concentration stage 108 has captured all or nearly all of the ionic materials present in the entire 6000 gpm output in a much smaller volume (e.g., 600 gpm, 60 gpm, etc.), the final product of the plant remains essentially constant. As such, the revenue generated by the smaller plant remains essentially the same as that of the full scale plant, while the cost of building the plant has been significantly reduced. This cost reduction may increase the return on investment, decrease the operating costs of the facility, and/or other have other financially beneficial effects due to the presence of concentrating stage 108.

Concentrated fluid 110 may also be passed to binary ionic separation stage 116, which may separate positively charged ions present in concentrated fluid 110 from negatively charged ions present in concentrated fluid 110. This separation may reduce the ability of ions to precipitate out of solution in fluids 118 and 120 respectively, as the positively charged ions present in fluid 118 will have no negative ions to combine with to form precipitate in fluid 118, and similarly the negatively charged ions present in fluid 120 will have fewer negative ions to combine with to form precipitate in fluid 120. Binary ionic separation state 116 may be employed prior to concentration stage 108, which may allow for greater volume reduction in concentration stage 108.

As with concentration stage 108, binary ionic separation stage 116 may allow for a larger concentration of ions of a certain polarity (i.e., positive and/or negative) to be present in fluid 118 and/or fluid 120 to be present in a given volume of fluid 118 and/or fluid 120. For ease of understanding, 1 ppm=1 milligram per liter, and the concentrations in this disclosure will most often be quoted in ppm.

For example, and not by way of limitation, in water, sodium chloride (NaCl) has a solubility of 358.9 grams/liter (i.e., 358,900 ppm) at 20° C., and a solubility of 389.9 grams/liter (389,900 ppm) at 100° C. If the water (e.g., the fluid) enters system 100 at 100° C., but during processing within system 100 loses heat such that the water cools to 20° C., 31 grams per liter of NaCl will precipitate out of the water within system 100. At 6000 gpm (22,700 liters per minute), 703.7 kilograms (kg) of NaCl per minute will precipitate out of the fluid. The presence of 703 kg/min of NaCl, not to mention any other compounds that may precipitate during processing within system 100, may cause the conduits, pipes, and/or other fluid pathways to clog and/or have reduced fluid flow.

In chemical and/or mechanical fluid processing, the solids (precipitates) are controlled to occur at certain points within the processing system such that the solids may be removed through filtration and/or mechanical skimming, controlled through temperature and/or pH fluid control, etc. In an aspect of the present disclosure, the sodium (Na+) and chlorine (Cl−) ions, which are dissolved in solution in fluid 102 (or fluids 106 and/or 110) are separated such that the Na+ and Cl− ions are less able to "recombine" to form a solid NaCl precipitate. In another aspect of the present disclosure, the sodium and/or chlorine ions are concentrated in a desired pathway and/or conduit, but the saturation levels of sodium chloride (or any other possible precipitate) within the desired pathway are controlled to maintain the fluidity of the fluids 102, 106, and/or 110 within system 100.

The binary ionic separation stage 116 separates ions of one polarity into fluid 118 from ions of the other polarity into fluid 120. Even if binary ionic separation stage 116 is only partially successful in separating ions by polarity, the probability of positive ions combining with negative ions in fluids 118 and/or 120 may be reduced. Further, binary ionic separation stage 116 may be performed in multiple passes of fluid 110, either in a recursive, parallel, and/or serial manner, such that the majority of ions of one polarity (e.g., positive) are in one fluid 118 (or 120), and the majority of ions of the other polarity are in the other fluid 120 (or 118, respectively).

When one polarity of ions is contained, as a majority of dissolved solids, in a fluid (for example, fluid 118, although similar arguments can be made for fluid 120 with the other polarity of ions), the precipitation of a given ion, e.g., Na+ and/or Cl−, is reduced. This reduction of possible precipitation targets (i.e., ions of the other polarity) may, effectively, increase the solubility of ions in fluid 118 (or fluid 120).

Figure 2:
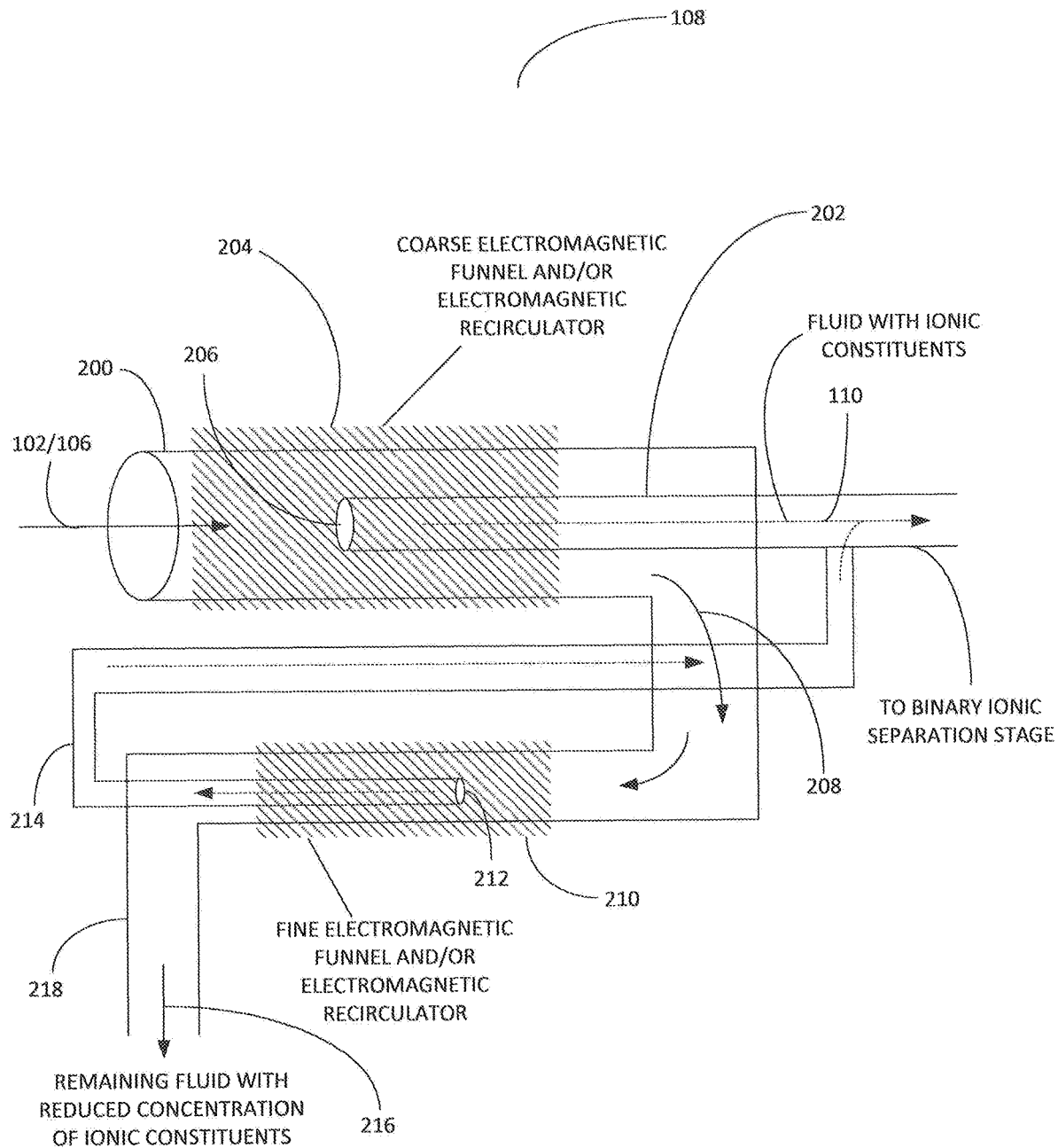
FIG. 2 illustrates a concentration stage in accordance with an aspect of the present disclosure.

FIG. 2 illustrates a concentration stage in accordance with an aspect of the present disclosure.

Inlet conduit 200 of concentration stage 108 receives fluid 102 (and/or filtered fluid 106, depending on whether filtration stage 104 is included in system 100). Internal conduit 202 is contained within inlet conduit 200. Electromagnetic funnel 204 is placed along a portion of inlet conduit 200, such that an electromagnetic field is created at least in the portion of inlet conduit 200 where electromagnetic funnel is placed.

As shown in FIG. 2, inlet 206 of internal conduit 202 is within electromagnetic funnel 204. Although shown as concentric and/or coaxial with inlet conduit 200, inlet 206 of internal conduit 200 may be placed at other locations within inlet conduit 200 without departing from the scope of the present disclosure. Further, although shown as being somewhat centralized to electromagnetic funnel 204, internal conduit 202 may be placed anywhere within inlet conduit 200 without departing from the scope of the present disclosure.

Once fluid 102/106 enters the electromagnetic funnel 204, ions within fluid 102/106 are affected by the electromagnetic field created by electromagnetic funnel 204. Depending on the type of electromagnetic field and the direction of the electromagnetic field that electromagnetic funnel 204 creates, ions within fluid 102/106 may be electromagnetically attracted to and/or repelled from certain locations within inlet conduit 200. As shown in FIG. 2, as an example and not by way of limitation, electromagnetic funnel 204 may create an electromagnetic field that moves ions within fluid 102/106 towards the inlet 206 of internal conduit 204. The strength of the electromagnetic field created by electromagnetic funnel 204, and the speed of fluid 102/106 flow, and/or other factors such as the ions present in fluid 102/106, may determine the amount of electromagnetic force needed in the allotted distance between the beginning of the electromagnetic funnel 204 and the inlet 206 to allow at least a portion of the ions in fluid 102/106 to be captured within internal conduit 202.

In an aspect of the present disclosure, the relative areas of inlet conduit 200 and inlet 206 of internal conduit 202 will reduce the amount of fluid (i.e., fluid volume) in internal conduit 202 compared to inlet conduit 200. This reduction in fluid volume thus reduces the amount of concentrated fluid 110 that will be passed to the next stage of system 100 (e.g., binary ionic separation stage 116, or other stages, depending on the configuration of system 100). However, the use of electromagnetic funnel 204 may increase the concentration of ionic materials that enter inlet 206, and thus may reduce the concentration of ionic materials that remain within inlet conduit 200, thereby increasing the concentration of ionic materials in fluid 110.

Fluid 208, i.e., the fluid that has passed through electromagnetic funnel 204 but did not enter inlet 206 of internal conduit 202, may now have a reduced and/or zero concentration of ionic materials in fluid 208. In an aspect of the present disclosure, fluid 208 may flow through an optional second electromagnetic funnel 210. This may further force ionic materials still present in fluid 208 into inlet 212 of conduit 214, and reduce the concentration of ionic materials in fluid 216 present in conduit 218.

Although shown as connected to internal conduit 202, conduit 214 may be connected to other portions of system 100 as desired. For example, and not by way of limitation, electromagnetic funnel 204 may only provide motive force to positively charged ionic materials in fluid 102/106, while electromagnetic funnel 210 may provide motive force to negatively charged ionic materials in fluid 208. In such an aspect of the present disclosure, electromagnetic funnels 204 and 210 are also separating the positively charged ionic materials from the negatively charged ionic materials, which may be processed separately and/or together as desired within system 100, without departing from the scope of the present disclosure.

Further, although the electromagnetic field is shown in FIG. 2 as being somewhat uniform across conduit 200, the electromagnetic field may be stronger along one part of conduit 200 than another. For example, and not by way of limitation, a bar magnet could be used to generate a magnetic field along one portion of conduit 200 that would be stronger where the bar magnet is close to conduit 200 and weaker across the diameter of conduit 200 without departing from the scope of the present disclosure.

Figure 3:
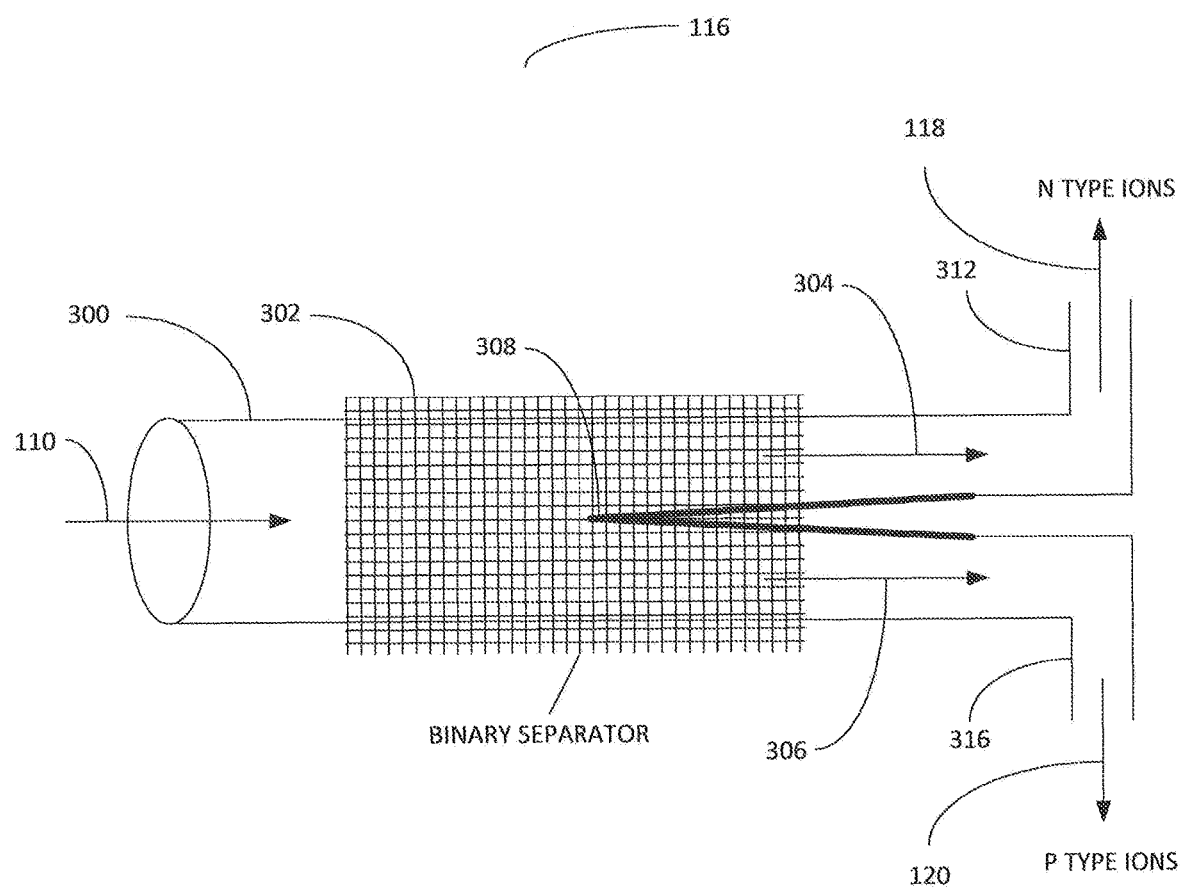
FIG. 3 illustrates a binary ionic separation stage in accordance with an aspect of the present disclosure.

FIG. 3 illustrates a binary ionic separation stage in accordance with an aspect of the present disclosure.

Maintaining the fluid 102 flow as shown in FIGS. 1 and 2, concentrated fluid 110 flows from concentration stage 106 to binary ionic separation stage 116 via conduit 300. Binary separator 302 applies an electromagnetic force to fluid 110, which separates ionic particles in concentrated fluid 110 into at least two different fluids 304 and 306. Within binary separator 302, gore point 308 separates concentrated fluid 110 into fluids 304 and 306.

Although shown as concentric and/or coaxial with conduit 300, gore point 308 may be placed at other locations within conduit 300 without departing from the scope of the present disclosure. Further, although shown as being somewhat centralized to binary separator 302, gore point 308 may be placed anywhere within conduit 300 without departing from the scope of the present disclosure.

Once concentrated fluid 110 enters the binary ionic separator 116, ions within concentrated fluid 110 are affected by the electromagnetic field created by binary separator 302. Depending on the type of electromagnetic field and the direction of the electromagnetic field that binary separator 302 creates, different polarities of ions within concentrated fluid 110 may be electromagnetically attracted to and/or repelled from certain locations within conduit 300.

As an example and not by way of limitation, binary separator 302 may create an electromagnetic field that moves (i.e., provides electromotive force to) negatively charged ions ("n-type ions") 118 within concentrated fluid 110 such that the randomly dispersed n-type ions 118 are directed towards the outlet 312 of binary ionic separator 116 rather than random distribution and/or dispersement of the n-type ions 118 between fluids 304 and 306. The strength of the electromagnetic field created by binary separator 302, and the speed of concentrated fluid 110 flow, and/or other factors such as which specific ions are present in fluid 110, may determine the amount of electromagnetic force needed in the allotted distance between the beginning of the binary separator 302 and the gore point 308 to allow at least a portion of one polarity of ions in concentrated fluid 110 to be directed toward fluid 304 (and outlet 312) rather than toward fluid 306.

Similarly, binary separator 302 may create an electromagnetic field that provides electromotive force to positively charged ions ("p-type ions") 120 within concentrated fluid 110 such that the randomly dispersed p-type ions 120 are directed towards the outlet 316 of binary ionic separator 116 rather than random distribution and/or dispersement of the p-type ions 120 between fluids 304 and 306. Again, the strength of the electromagnetic field created by binary ionic separator 302, and the speed of concentrated fluid 110 flow, and/or other factors such as the ions present in fluid 110, may determine the amount of electromagnetic force needed in the allotted distance between the beginning of the binary ionic separator 302 and the gore point 308 to allow at least a portion of one polarity of ions in concentrated fluid 110 to be directed toward fluid 306 (and outlet 316) rather than toward fluid 304.

Figure 4:
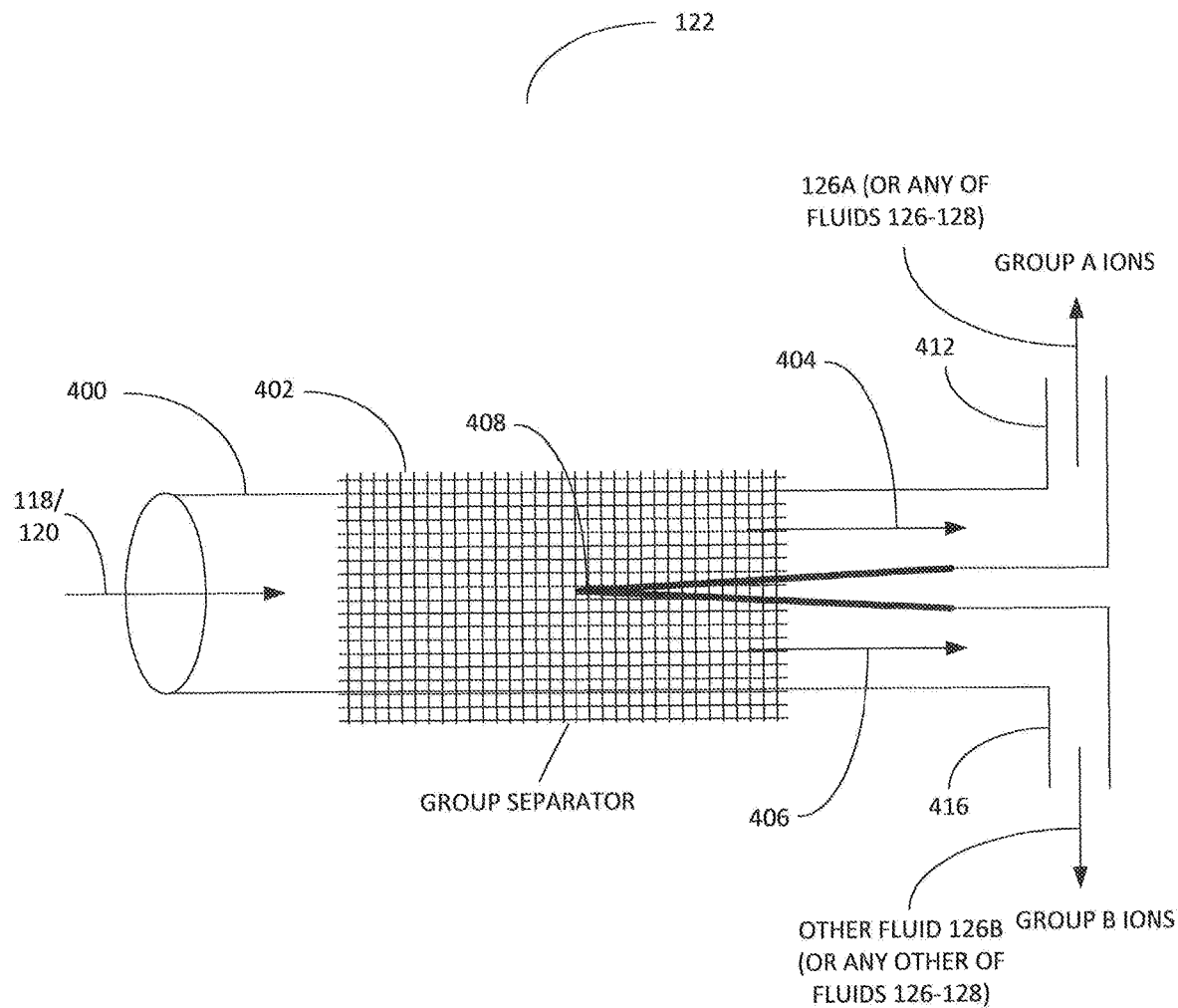
FIG. 4 illustrates a group separation stage in accordance with an aspect of the present disclosure.

FIG. 4 illustrates a group separation stage in accordance with an aspect of the present disclosure.

Maintaining the fluid 102 flow as shown in FIGS. 1, 2, and 3, fluid 118 (or fluid 120) flows from binary ionic separation stage 116 to group separation stage 122 (or 124) via conduit 400. Group separator 302 applies an electromagnetic force to fluid 118, which separates ionic particles in fluid 118 into at least two different fluids 404 and 406. Within group separator 402, gore point 408 separates fluid 118 into fluids 404 and 406.

Although shown as concentric and/or coaxial with conduit 400, gore point 408 may be placed at other locations within conduit 400 without departing from the scope of the present disclosure. Further, although shown as being somewhat centralized to group separator 402, gore point 408 may be placed anywhere within conduit 300 without departing from the scope of the present disclosure.

Once fluid 114 enters the group separation stage 116, ions within fluid 118 are affected by the electromagnetic field created by group separator 402. Depending on the type of electromagnetic field and the direction of the electromagnetic field that group separator 402 creates, different types of ions within fluid 118 may be electromagnetically attracted to and/or repelled from certain locations within conduit 400.

As an example and not by way of limitation, group separator 402 may create an electromagnetic field that moves (i.e., provides electromotive force to) some ions ("Group A ions") 126A (or any other ions 126B-N and/or 128A-N) within fluid 118 such that the randomly dispersed Group A ions 126A (as an example of the possible Groups of ions in ions 126A-N and/or 128A-N) are directed towards the outlet 412 of group separation stage 122 rather than random distribution and/or dispersement of the Group A ions 126A between fluids 404 and 406. The strength of the electromagnetic field created by group separator 302, and the speed of fluid 118 flow, and/or other factors such as which specific ions are present in fluid 118, may determine the amount of electromagnetic force needed in the allotted distance between the beginning of the group separator 402 and the gore point 408 to allow at least a portion of the Group A ions 126A in fluid 118 to be directed toward fluid 404 (and outlet 412) rather than toward fluid 406.

Similarly, group separator 402 may create an electromagnetic field that provides electromotive force to other ions ("Group B ions") 414 within fluid 118 such that the randomly dispersed Group B ions 414 are directed towards the outlet 416 of group separation stage 122 rather than random distribution and/or dispersement of the Group B ions 414 between fluids 404 and 406. Again, the strength of the electromagnetic field created by group separator 402, and the speed of fluid 118 flow, and/or other factors such as the ions present in fluid 118, may determine the amount of electromagnetic force needed in the allotted distance between the beginning of the group separator 402 and the gore point 408 to allow at least a portion of the Group B ions 414 in fluid 118 to be directed toward fluid 406 (and outlet 416) rather than toward fluid 404.

Although referring only to fluid 118, the descriptions and discussion with respect to FIG. 4 of the present disclosure may also be applied to fluid 120 without departing from the scope of the present disclosure.

In an aspect of the present disclosure, fluid 118 may comprise mostly n-type ions 118. Since all n-type ions 118 are negatively charged, group separator 402 may separate those n-type ions 118 having a −1 charge from those n-type ions 118 having a −2 charge, or may separate n-type ions 118 having a −1 charge from n-type ions 118 having a charge other than −1. Such a separation may be considered as a separation of ions into "groups" similar to the groups (columns) of the periodic table of elements.

Figure 5:
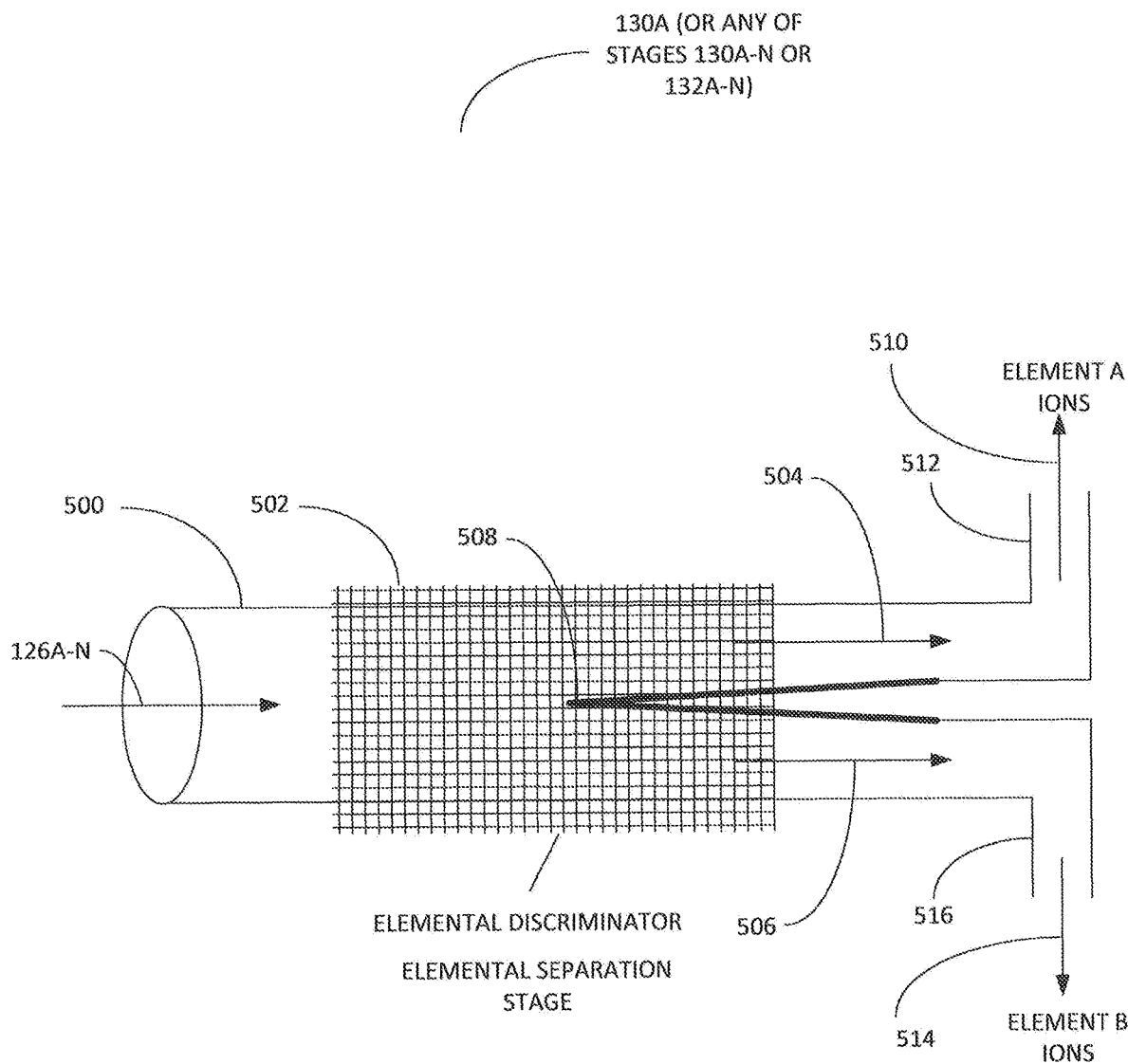
FIG. 5 illustrates an elemental separation stage in accordance with an aspect of the present disclosure.

FIG. 5 illustrates an elemental separation stage in accordance with an aspect of the present disclosure.

Maintaining the fluid 102 flow as shown in FIGS. 1, 2, 3, and 4, fluids 126A-126N (or fluids 128A-N) flow from group separation stage 122 (or 124) to element separation stage 130A-N (or 132A-N) via conduit(s) 500. For ease of description, one fluid 126A will be discussed herein, however, it is to be understood that any of fluids 126A-N and/or 128A-N may be substituted without departing from the scope of the present disclosure. Elemental discriminator 502 applies an electromagnetic force to fluid 126A, which separates ionic particles in fluid 126A into at least two different fluids 504 and 506. Within elemental discriminator 502, gore point 508 separates fluid 126A into fluids 504 and 506.

Although shown as concentric and/or coaxial with conduit 500, gore point 508 may be placed at other locations within conduit 500 without departing from the scope of the present disclosure. Further, although shown as being somewhat centralized to elemental discriminator 502, gore point 508 may be placed anywhere within conduit 500 without departing from the scope of the present disclosure.

Once fluid 126A enters the element separation stage 130A, ions within fluid 126A are affected by the electromagnetic field created by elemental separator 502. Depending on the type of electromagnetic field and the direction of the electromagnetic field that elemental separator 502 creates, different types of ions within fluid 126A may be electromagnetically attracted to and/or repelled from certain locations within conduit 500.

As an example and not by way of limitation, elemental separator 502 may create an electromagnetic field that moves (i.e., provides electromotive force to) some ions ("Element A ions") 510 within fluid 126A such that the randomly dispersed Element A ions 510 are directed towards the outlet 512 of element separation stage 130A rather than random distribution and/or dispersement of the Element A ions 510 between fluids 504 and 506. The strength of the electromagnetic field created by element separator 502, and the speed of fluid 126A flow, and/or other factors such as which specific ions are present in fluid 126A-N, may determine the amount of electromagnetic force needed in the allotted distance between the beginning of the element separator 502 and the gore point 508 to allow at least a portion of the Element A ions 510 in fluid 126A to be directed toward fluid 506 (and outlet 512) rather than toward fluid 504.

Similarly, element separator 502 may create an electromagnetic field that provides electromotive force to other ions ("Element B ions") 514 within fluid 126A such that the randomly dispersed Element B ions 514 are directed towards the outlet 516 of group separation stage 130A rather than random distribution and/or dispersement of the Element B ions 514 between fluids 504 and 506. Again, the strength of the electromagnetic field created by element separator 502, and the speed of fluid 126A flow, and/or other factors such as the ions present in fluid 126A, may determine the amount of electromagnetic force needed in the allotted distance between the beginning of the element separator 502 and the gore point 508 to allow at least a portion of the Element B ions 514 in fluid 126A to be directed toward fluid 506 (and outlet 516) rather than toward fluid 504.

Although referring only to fluid 126A, the descriptions and discussion with respect to FIG. 5 of the present disclosure may also be applied to fluids 126A-126N and/or fluids 128A-N without departing from the scope of the present disclosure.

In an aspect of the present disclosure, fluid 126A may comprise mostly Group 1 type ions, e.g., those elements in column 1 of the periodic table having one electron in their outer orbital shell, those elements that are ionized to a −1 charge, etc. 118. Since all Group 1 type ions are negatively charged to a −1 ionic state, element separator 502 may separate the Group 1 type ions into individual element ions 510 and/or 514. For example, and not by way of limitation, fluid 126A may comprise lithium, sodium, and potassium, all of which have a −1 ionic state in solution (and are in Group 1 of the periodic table). Element separator 502 may apply an electromagnetic field to fluid 126A to separate one of these elements, e.g., lithium, from the other elements, e.g., sodium and potassium, such that the lithium ions present in fluid 126A are directed toward fluid 504 while the sodium and potassium ions in fluid 126A are directed toward fluid 506. Such a separation may be considered as a separation of ions into "elements" similar to the elements in the periodic table of elements.

Figure 6:
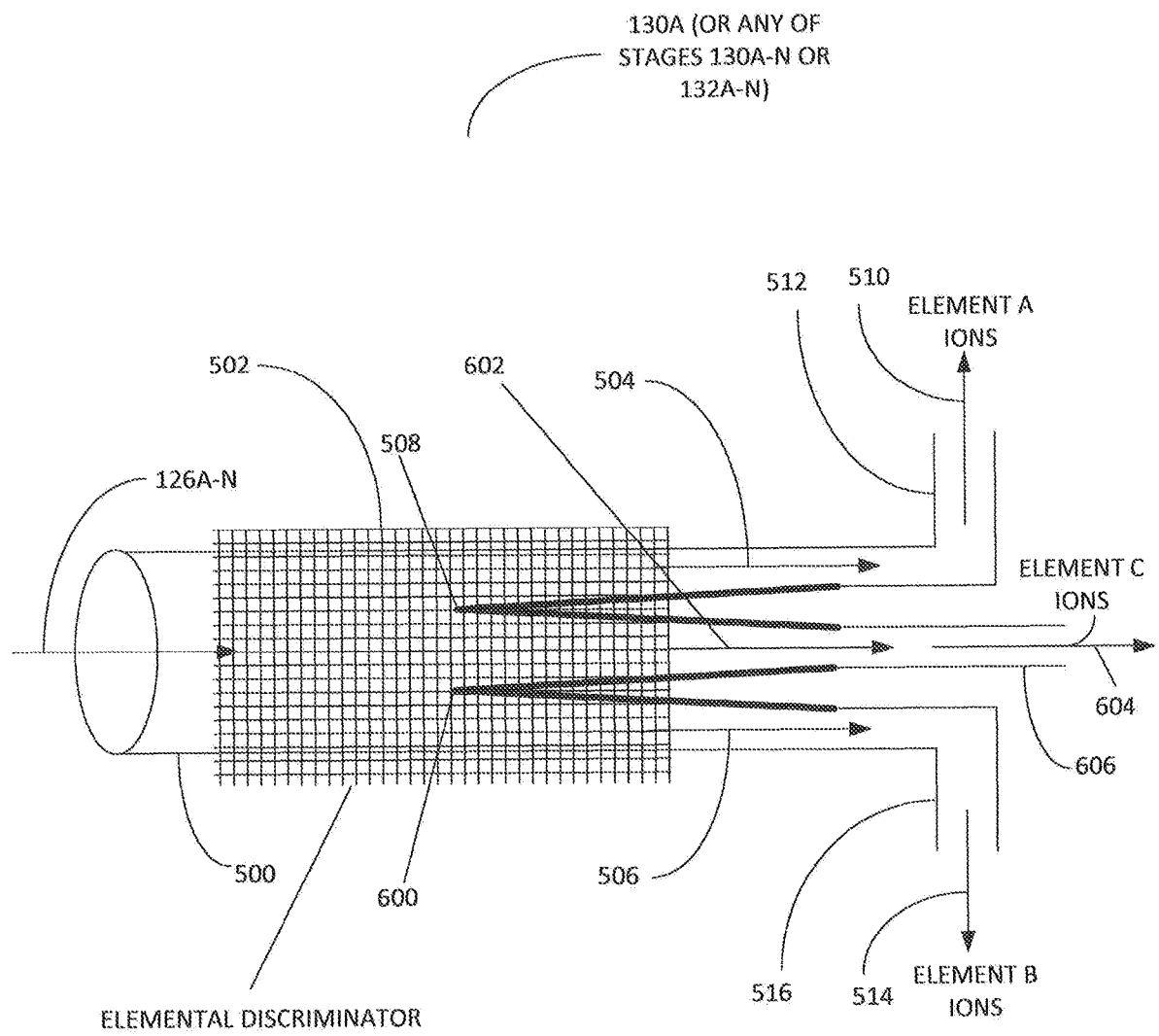
FIG. 6 illustrates another elemental separation stage in accordance with an aspect of the present disclosure.

FIG. 6 illustrates another elemental separation stage in accordance with an aspect of the present disclosure.

Maintaining the fluid 102 flow as shown in FIGS. 1, 2, 3, and 4, fluids 126A-126N (or fluids 128A-N) flow from group separation stage 122 (or 124) to element separation stage 130A-N (or 132A-N) via conduit(s) 500. For ease of description, one fluid 126A will be discussed herein, however, it is to be understood that any of fluids 126A-N and/or 128A-N may be substituted without departing from the scope of the present disclosure. Elemental discriminator 502 applies an electromagnetic force to fluid 126A, which separates ionic particles in fluid 126A into at least two different fluids 504 and 506. Within elemental discriminator 502, gore point 508 separates fluid 126A into fluids 504 and 506.

In FIG. 6, a second gore point 600 is also introduced into conduit 500 such that gore points 508 and 600 separate fluid 126A into fluids 504, 506, and 602.

Although shown as equidistant, concentric and/or coaxial with conduit 500, gore points 508 and 600 may be placed at other locations within conduit 500 without departing from the scope of the present disclosure. Further, although shown as being somewhat centralized to elemental discriminator 502, gore points 508 and 600 may be placed anywhere within conduit 500 without departing from the scope of the present disclosure. Further, gore point 508 may be placed at one distance into elemental discriminator 502, and gore point 600 may be placed further into elemental discriminator 502, a shallower distance (less distance from the output end of conduit 500) into elemental discriminator 502, or a similar distance into elemental discriminator 502 as gore point 508 without departing from the scope of the present disclosure.

Once fluid 126A enters the element separation stage 130A, ions within fluid 126A are affected by the electromagnetic field created by elemental separator 502. Depending on the type of electromagnetic field and the direction of the electromagnetic field that elemental separator 502 creates, different types of ions within fluid 126A may be electromagnetically attracted to and/or repelled from certain locations within conduit 500.

As an example and not by way of limitation, elemental separator 502 may create an electromagnetic field that moves (i.e., provides electromotive force to) some ions ("Element A ions") 510 within fluid 126A such that the randomly dispersed Element A ions 510 are directed towards the outlet 512 of element separation stage 130A rather than random distribution and/or dispersement of the Element A ions 510 between fluids 504, 506, and 602. The strength of the electromagnetic field created by element separator 502, and the speed of fluid 126A flow, and/or other factors such as which specific ions are present in fluid 126A-N, may determine the amount of electromagnetic force needed in the allotted distance between the beginning of the element separator 502 and the gore point 508 to allow at least a portion of the Element A ions 510 in fluid 126A to be directed toward fluid 506 (and outlet 512) rather than toward fluids 504 and/or 602.

Similarly, element separator 502 may create an electromagnetic field that provides electromotive force to other ions ("Element B ions") 514 within fluid 126A such that the randomly dispersed Element B ions 514 are directed towards the outlet 516 of group separation stage 130A rather than random distribution and/or dispersement of the Element B ions 514 between fluids 504, 506, and 602. Again, the strength of the electromagnetic field created by element separator 502, and the speed of fluid 126A flow, and/or other factors such as the ions present in fluid 126A, may determine the amount of electromagnetic force needed in the allotted distance between the beginning of the element separator 502 and the gore point 508 to allow at least a portion of the Element B ions 514 in fluid 126A to be directed toward fluid 506 (and outlet 516) rather than toward fluids 504 and/or 602.

In FIG. 6, a third "class" of ions may be affected by the electromagnetic field created by element separator 502 that provides electromotive force to other ions ("Element C ions") 604 within fluid 126A such that the randomly dispersed Element C ions 604 are directed towards the outlet 606 of group separation stage 130A, and into fluid 602, rather than random distribution and/or dispersement of the Element C ions 604 between fluids 504, 506, and 602. Again, the strength of the electromagnetic field created by element separator 502, and the speed of fluid 126A flow, and/or other factors such as the ions present in fluid 126A, may determine the amount of electromagnetic force needed in the allotted distance between the beginning of the element separator 502 and the gore points 508 and 600 to allow at least a portion of the Element C ions 604 in fluid 126A to be directed toward fluid 602 (and outlet 606) rather than toward fluids 504 and/or 506.

Although referring only to fluid 126A, the descriptions and discussion with respect to FIG. 6 of the present disclosure may also be applied to fluids 126A-126N and/or fluids 128A-N without departing from the scope of the present disclosure. Further, any fluid within system 100 may be used as an input to the elemental discriminator 502 as described with respect to FIGS. 5 and 6 without departing from the scope of the present disclosure.

In an aspect of the present disclosure with respect to FIG. 6, fluid 126A may comprise mostly Group 1 type ions, e.g., those elements in column 1 of the periodic table having one electron in their outer orbital shell, those elements that are ionized to a −1 charge, etc. 118. Since all Group 1 type ions are negatively charged to a −1 ionic state, element separator 502 may separate the Group 1 type ions into individual element ions 510 and/or 514. For example, and not by way of limitation, fluid 126A may comprise lithium, sodium, and potassium, all of which have a −1 ionic state in solution (and are in Group 1 of the periodic table). Element separator 502 may apply an electromagnetic field to fluid 126A to separate each of these elements, from each other, such that e.g., the lithium ions present in fluid 126A are directed toward fluid 504, the sodium ions present in fluid 126A are directed to fluid 604, and the potassium ions in fluid 126A are directed toward fluid 506. Such a separation may be considered as a separation of ions into "elements" similar to the elements in the periodic table of elements.

Additional fluid outlets 512, 516, and 606 may be included in elemental separation stage 130A-N and/or 132A-N, and/or in group separation stages 122 and/or 124 without departing from the scope of the present disclosure.

Figure 7:
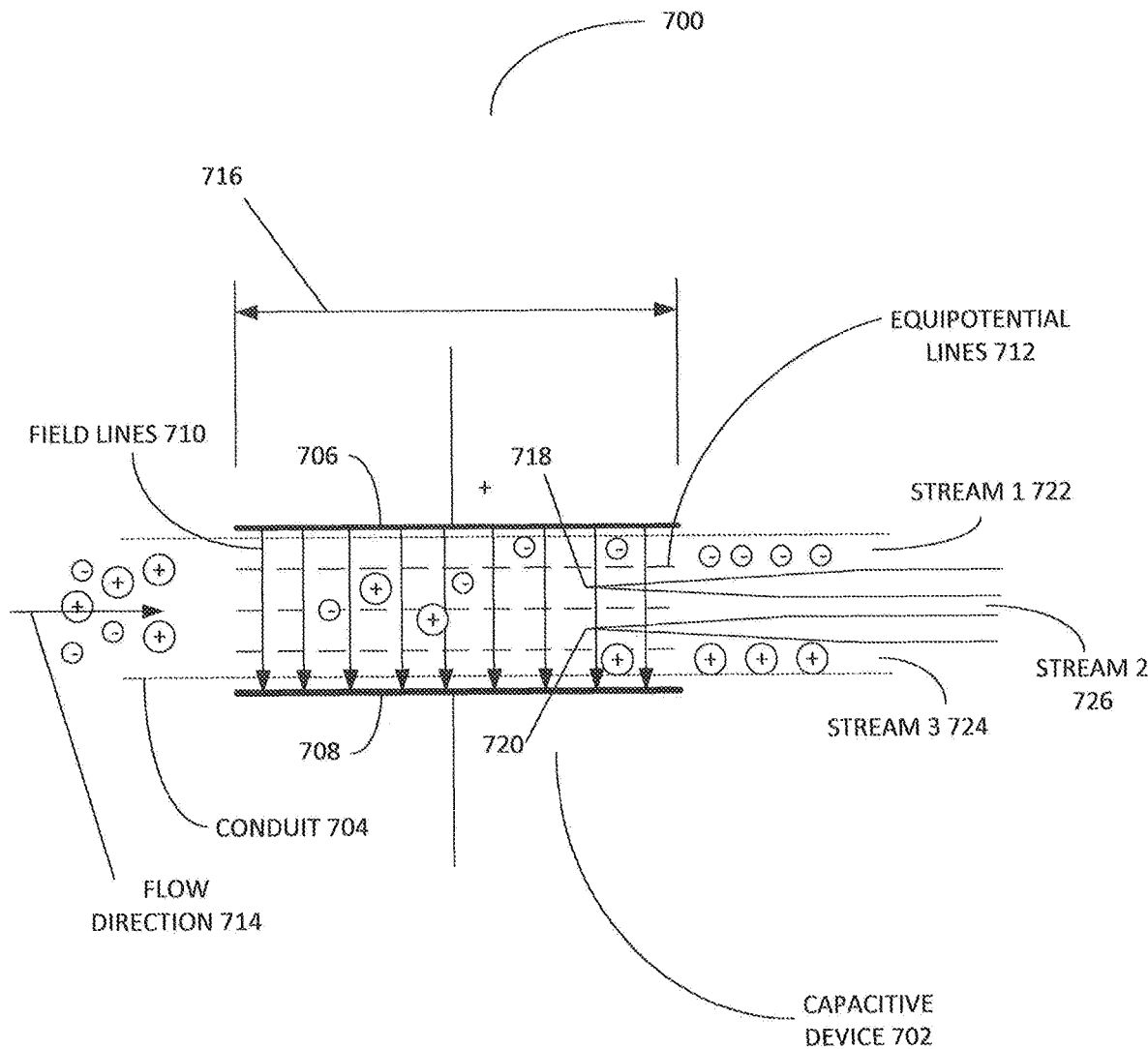
FIG. 7 illustrates an embodiment of a separation stage in accordance with an aspect of the present disclosure.

FIG. 7 illustrates an embodiment of a separation stage in accordance with an aspect of the present disclosure.

As shown in FIG. 7, a separation stage 700 (which may be one or more of group separation stages 122 and/or 124, and/or one or more of elemental separation stages 130A-N and/or 132 A-N) in an aspect of the present disclosure may be a capacitive device 702. To simplify the explanation of how separation stage 700 applies electromagnetic forces to fluids in system 100, a parallel plate capacitor is shown as capacitive device 702; however, any device that applies magnetic and/or electric fields to fluids in system 100 without departing from the scope of the present disclosure.

A conduit 704, which may be any of the conduits where a fluid is flowing in system 100 as described in the present disclosure, is placed between the positive plate 706 and the negative plate 708 of capacitive device 702. When a voltage is applied across the positive plate 706 and the negative plate 708, an electric field is created between the positive plate 706 and the negative plate 708. Field lines 710 illustrate the direction of the electric field between the positive plate 706 and the negative plate 708.

Equipotential lines 712, shown as dashed lines in FIG. 7, illustrate some of the distances between the positive plate 706 and the negative plate 708 where the electrical potential is equal between the positive plate 706 and the negative plate 708. For example, and not by way of limitation, a 4 volt direct current (VDC) voltage may be applied between the positive plate 706 and the negative plate 708. Each of the equipotential lines 712 shown in FIG. 7 may then represent a change of 1 VDC between the positive plate 706 and the negative plate 708. Many more equipotential lines 712 may exist between the positive plate 706 and the negative plate 708 without departing from the scope of the present disclosure. Further, the equipotential lines 712 may be equally and/or unequally spaced between the positive plate 706 and the negative plate 708 without departing from the scope of the present disclosure.

In essence, the fluid in conduit 704 is similar to a dielectric material in capacitive device 702. Since the fluid has various ionic materials of various charge polarities and values, each of the ionic materials in the fluid of conduit 704 will be affected differently by the electromagnetic field created by capacitive device 702.

Because each element in the periodic table has different electropotentials, each element has either a different ionic state and/or different electronegativity values, the application of an electromagnetic field, such as that generated by capacitive device 702, will affect each ionic material in the fluid of conduit 704 differently. Those that are more electronegative, or are negatively charged ions (anions) will be attracted to the positive plate 706 and/or repelled by the negative plate 708; those with less electronegativity, or are positively charged ions (cations) that may be known, the application of an electric field by capacitive device. The presence of field lines 710, generated by capacitive device 702, may move the essentially randomly-distributed anions and/or cations in the fluid of conduit 702 to a more uniform collection.

In other words, the randomly distributed anions will be attracted to the positive plate 706, and the randomly distributed cations will be attracted to the negative plate 708. Because the fluid in conduit 704 flows in direction 714, which is essentially parallel to the positive plate 706 and the negative plate 708, the motion of the fluid will continue to move the cations and anions along the length 716 of capacitive device 702, while the electromagnetic field of capacitive device 702 moves the cations and anions perpendicular to the flow direction 714.

As such, capacitive device 702 may create a larger than random distribution of anions near the positive plate 706, and/or a larger than random distribution of cations near the negative plate 708. By placing gore points 718 and/or 720 to reduce the possibility of the new distribution of cations and anions in flow direction 714, output stream 1 722 may comprise a larger percentage of anions than the random distribution present in flow 714, and/or output stream 3 724 may comprise a larger percentage of cations than the random distribution present in flow 714. Stream 2 726 may comprise a mixture of cations and anions, or may contain no cations and/or anions at all.

Depending on the strength of the field lines 710, which may be increased and/or decreased by changing the voltage potentials supplied to the positive plate 706 and the negative plate 708 of capacitive device 702, the perpendicular force applied to the cations and anions will change. The perpendicular force, as a ratio and/or comparison to the velocity of the speed of the fluid in flow direction 714, may then determine, at least in part, where gore points 718 and/or 720 are placed to separate the ions in the fluid of conduit 704. Depending on what ions are present in the fluid of conduit 704, in an aspect of the present disclosure, different amounts of electropotential (voltage) may be applied to positive plate 706 and/or negative plate 708, or various difference of electropotential may be applied between positive plate 706 and/or negative plate 708, to more effectively separate the cations and/or anions present in the fluid of conduit 704 into stream 1 722, stream 2 724, and/or stream 3 726. As an example, negative plate 708 may be connected to ground (0 VDC) for separation of some ions, but may be connected to a positive or negative voltage for other ions, where the difference in potential between positive plate 706 and negative plate 708 may be more effective in ionic separation of the fluid in conduit 704.

Figure 8:
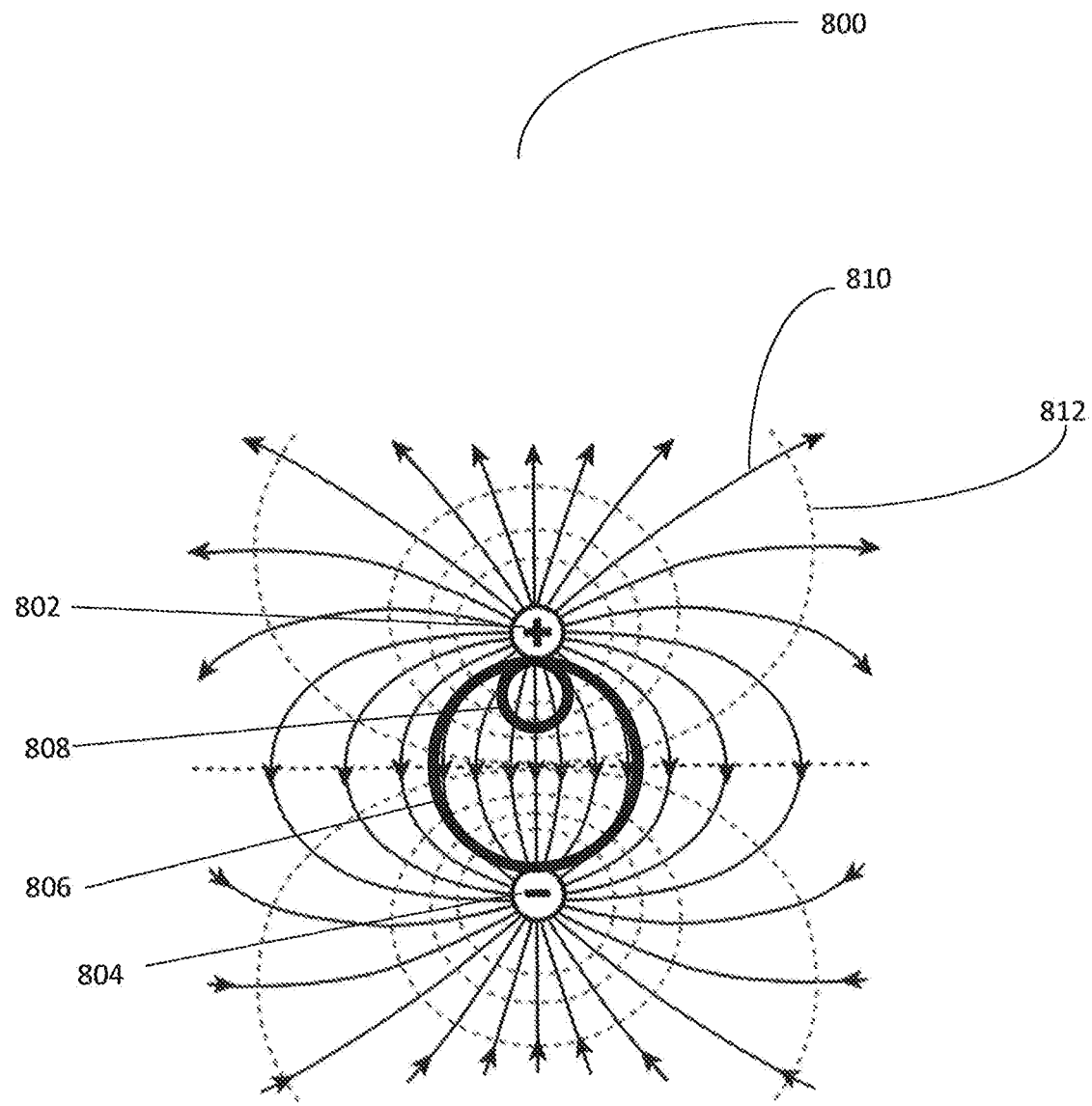
FIG. 8 illustrates an embodiment of a separation stage in accordance with an aspect of the present disclosure.

FIG. 8 illustrates an embodiment of a separation stage in accordance with an aspect of the present disclosure.

Separation stage 800, which may be one or more of group separation stages 122 and/or 124, and/or one or more of elemental separation stages 130A-N and/or 132 A-N) in an aspect of the present disclosure may be a positively charged source 802 spaced apart from a negatively charged source 804. Positively charged source 802 and negatively charged source 804 may be wires (and thus the view of FIG. 8 is a cross-sectional view), point sources, spheres, or other sources of positive and negative charge. Conduit 806 and internal conduit 808 are shown as being in between positively charged source 802 and negatively charged source 804.

In the configuration of FIG. 8, field lines 810 and equipotential lines 812 (in dashed lines for clarity) are substantially distributed as shown. Field lines 810 and equipotential lines 812 are essentially perpendicular to each other within the field. Thus, internal conduit 808 intersects only the positive equipotential lines 812 and the more positive portion of field lines 810 created by separation stage 800. Anions, i.e., negatively charged ions in a fluid flowing in conduit 806 (i.e., either into or out of the page as shown in FIG. 8), will be attracted to the positively charged source 802 and/or repelled by the negatively charged source 804. When internal conduit 808 begins within the field lines 810 (as described with respect to FIGS. 3-7, anions will be contained within internal conduit 808 and separated from cations and/or the remainder of the fluid flowing in conduit 806. Depending on the relative diameters of conduit 806 and/or internal conduit 808, separation stage 800 may reduce the amount of fluid flowing through internal conduit 808, thus reducing the size of processing equipment in any associated system 100 for separation stage 800.

As an example, and not by way of limitation, in an aspect of the present disclosure, a separation stage 700 and/or 800 may be used to desalinate fluids, e.g., water. Salt water is a combination of dissolved sodium chloride, and in seawater and/or ocean water, up to five percent (5%) of the fluid may be dissolved ions of sodium and chlorine. A separation stage 800 may be used to separate the sweater anions, e.g., chlorine ions, from the seawater fluid flowing in conduit 806 and contain the chlorine anions in internal conduit 808. A second separation stage 800 may be used, with internal conduit 808 closer to the negatively charged source 804, to then remove the sodium cations from the seawater. Alternatively and/or in addition, a separation stage as shown in FIGS. 6 and/or 7, employing capacitive device 702, may be used to separate the chlorine anions and the sodium cations from the incoming fluid in conduit 704 in a single separation stage 700, with reduced amounts of dissolved sodium chloride flowing through flow 602 and/or stream 2 726. The fluid may be passed through several separation stages 700 and/or 800 to further reduce the dissolved sodium chloride in the fluid, such that a final separation stage 700 and/or 800 may produce drinking and/or potable water from stream 2 726.

Figure 9:
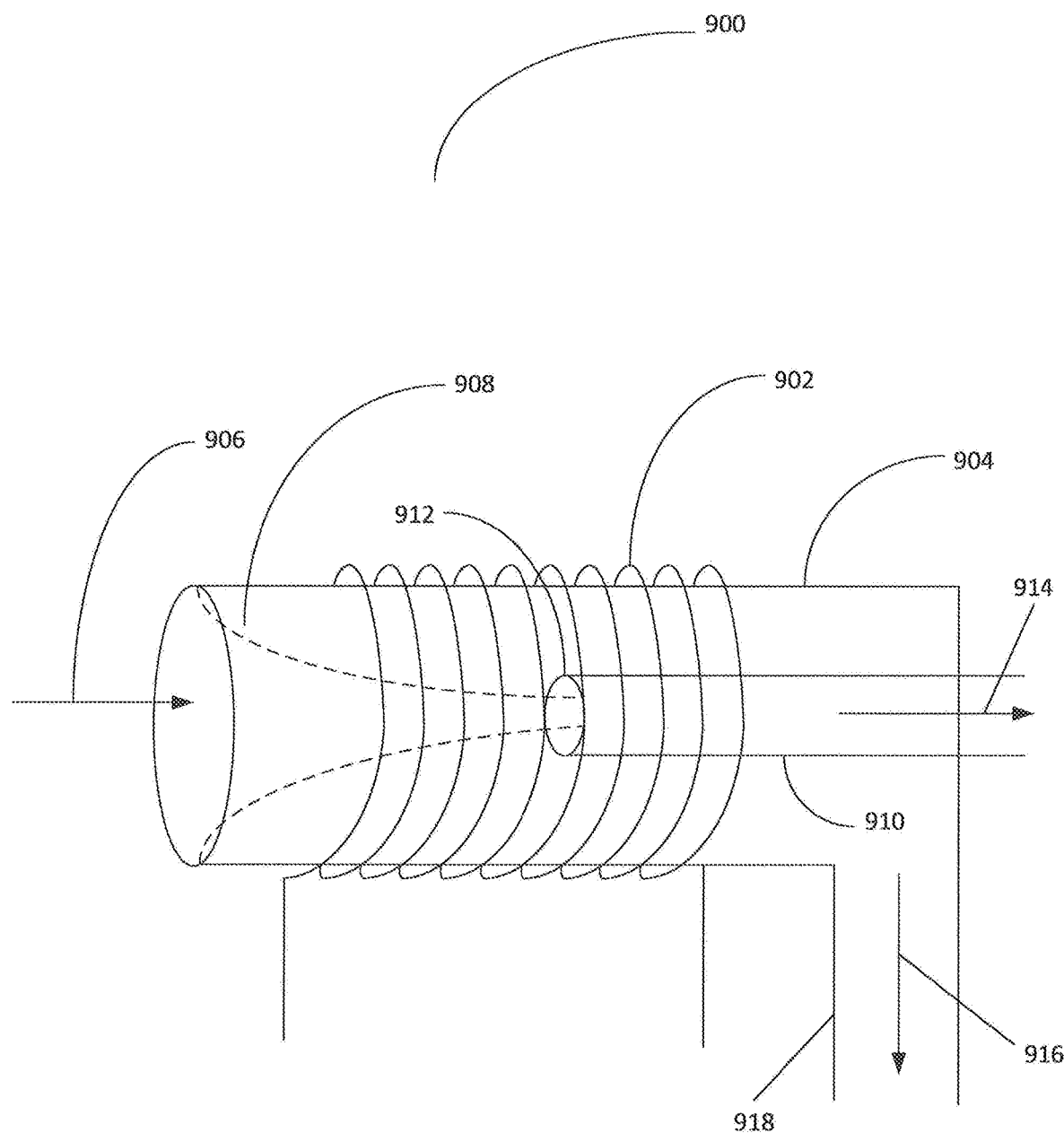
FIG. 9 illustrates an electromagnetic funnel in accordance with an aspect of the present disclosure.

FIG. 9 illustrates an electromagnetic funnel in accordance with an aspect of the present disclosure.

Electromagnetic funnel 900 may comprise magnetic device 902, which may be an inductive coil wrapped around conduit 904. As fluid 906 enters conduit 904, the magnetic field generated by magnetic device 902 creates a force (magnetic field) shown by lines 908 that magnetically move cations and/or anions from fluid 906 toward the center axis of conduit 904. As the magnetic lines 908 converge, and depending on the speed of fluid 906 flow through conduit 904, internal conduit 910 may be placed such that opening 912 of internal conduit 910 intercepts the concentrated flow of anions and/or cations in fluid 906.

As such, fluid 906 is separated into fluids 914 and 916, where fluid 914 flows in internal conduit 910 and fluid 916 flows in conduit 918. In fluid 906, cations and anions present in fluid 906 may be randomly dispersed. Because of the field lines 908 in electromagnetic funnel 900, fluid 914 may comprise an increased amount of cations and/or anions over the random distribution concentration, and fluid 916 may comprise a decreased amount of cations and/or anions below the random distribution concentration present in fluid 906. Of course, depending on the direction of the magnetic field lines 908, the cations and/or anions may be repelled from the central axis of conduit 904, and thus the ionic concentrations in conduits 910 and 918 may be reversed compared to field lines 908 that attract cations and/or anions toward internal conduit 910 without departing from the scope of the present disclosure.

An electromagnetic funnel 900 in accordance with an aspect of the present disclosure may reduce the amount of fluid entering system 100, e.g., fluid 102, such that any processing of subsequent fluid flows in system 100 only process a portion of fluid 102 while not reducing the amount of ions within fluid 102 that are subjected to processing within system 100. For example, and not by way of limitation, lithium ions may be dissolved in fluid 906 (or fluid 102) at a concentration of 150 ppm, and fluid 906/102 is entering system 100 at a rate of 600 gpm. Rather than attempting to process the entire 600 gpm to attempt to remove the 150 ppm of lithium ions, electromagnetic funnel 900 may concentrate the lithium ions present in fluid 102/906 into fluid 914, which may be a fraction of the entire 600 gpm entering system 100. If the ratio of the diameters of conduit 904 and internal conduit 914 is 10:1, then internal conduit 914 is only carrying fluid at a rate of 60 gpm. A second electromagnetic funnel 900, and/or a series of electromagnetic funnels 900, may be placed in series, and/or, as shown in FIG. 2, may be placed in parallel to ensure that as much of the desired ionic material (in this particular example, lithium) present in fluid 906 as economically and/or technically feasible is directed toward a smaller fluid flow, e.g., fluid 914. The remaining fluid 916, as it contains fewer of the desired ionic materials, may then be directed to bypass system 100 rather than process fluid containing either smaller traces of the desired ionic material and/or none of the desired ionic material in fluid 906.

There may be limitations on the amount of reduction of fluid to be processed in a system 100, which may be based on the amount of desired material present in fluid 906, the amount of other materials dissolved in fluid 906, the solubility of one or more other dissolved materials in fluid 906, pH of fluid 906, temperature of fluid 906, speed of fluid 906 flow, and/or other factors. However, electromagnetic funnels 204, 212, and or 900, and/or separation devices 302, 402, 502, 700, and/or 800 may reduce the fluid 906 that enters system 100 such that system 100 can be reduced in size and/or have fewer design requirements, and may also reduce the costs associated with construction, operation, and/or maintenance of an extraction plant incorporating any portion of system 100.

It is to be noted that the electromagnetic funnels 204, 212, and or 900, and/or separation devices 302, 402, 502, 700, and/or 800 are not immersed in the fluid 906 flow. In an aspect of the present disclosure, the electromagnetic funnels 204, 212, and or 900, and/or separation devices 302, 402, 502, 700, and/or 800 affect the cations and/or anions in fluid 906 without disrupting or interfering with the fluid 906 flowing in the conduits present in system 100.

The electromagnetic fields generated by electromagnetic funnels 204, 212, and or 900, and/or separation devices 302, 402, 502, 700, and/or 800 affect the random dispersion of the cations and/or anions that are present in fluid 906 (or any fluid that electromagnetic funnels 204, 212, and or 900, and/or separation devices 302, 402, 502, 700, and/or 800 would be used in proximity to) such that cations and/or anions present in the fluid 906 affected by electromagnetic funnels 204, 212, and or 900, and/or separation devices 302, 402, 502, 700, and/or 800 are moved away from a random distribution and toward a more concentrated distribution within fluid 906. Once the concentration and/or relative concentration of cations and/or anions has been effected by electromagnetic funnels 204, 212, and or 900, and/or separation devices 302, 402, 502, 700, and/or 800, the fluid 906 is separated into two or more fluids (e.g., fluid 914 and 916) in separate conduits (e.g., conduits 910 and 918) to isolate and/or concentrate one or more cations and/or anions of interest in fluid 906.

Figure 10:
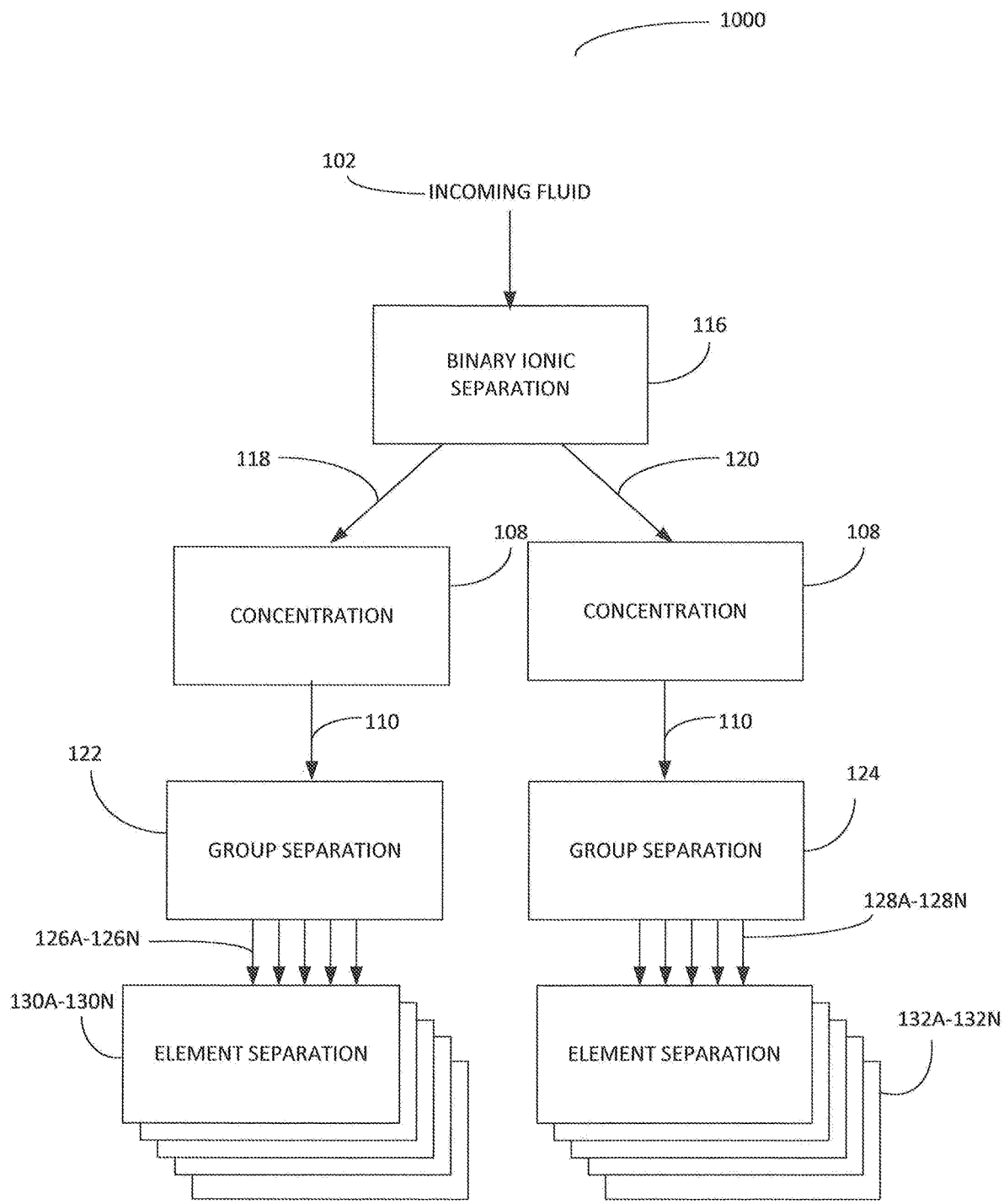
FIG. 10 illustrates a block diagram in accordance with an aspect of the present disclosure.

FIG. 10 illustrates a block diagram in accordance with an aspect of the present disclosure.

In comparison with FIG. 1, rather than performing a concentration stage 108 as an initial processing stage in system 100, system 1000 comprises a binary ionic separation stage 116 as an initial processing stage, which may allow for increased reduction in the fluid flow in the remainder of system 1000. Because cations and anions are separated, or at least partially separated by binary ionic separation stage, the possibility for precipitation of interacting cations and anions within fluids 118 and/or 120, and any further fluid flows in system 1000, may be reduced, thus allowing for increased reduction in the processing of fluids in one or more stages of system 1000 that are downstream from binary ionic separation stage 116.

Concentration stage 108 may be coupled directly to binary ionic separation stage 116, and/or may be employed elsewhere within system 1000 without departing from the scope of the present disclosure. For example, and not by way of limitation, concentration stage 108 may be coupled directly to binary ionic separation stage 116 to make group separation stages 122/124 more efficient, reduce concentrated fluid 110 flow, and/or other reasons. Additionally and/or alternatively, a concentration stage 108 may be employed between group separation stage 122/124 and one or more element separation stages 130A-N and/or 132A-N depending on the ions desired as outputs from such separation stages. Many possible configurations of systems 100 and/or 1000 are possible given the teachings of the present disclosure.

Figure 11:
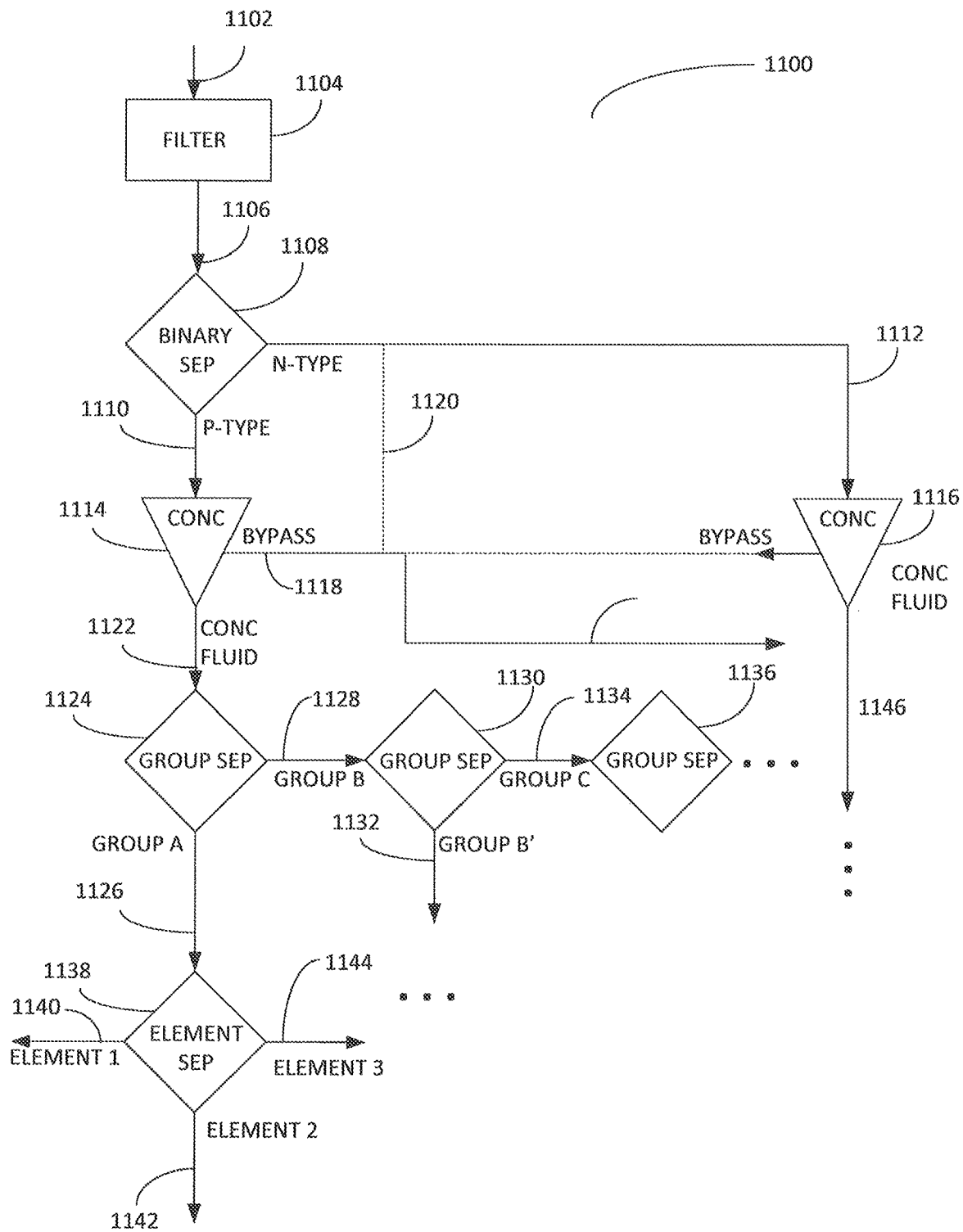
FIG. 11 illustrates a flow diagram in accordance with an aspect of the present disclosure.

FIG. 11 illustrates a flow diagram in accordance with an aspect of the present disclosure.

As an example, and not by way of limitation, in an aspect of the present disclosure, flow 1100 may be employed within system 100 and/or system 1100. Incoming fluid 1102, which may be similar to incoming fluid 102, enters filter 1104. Filtered fluid 1106, which may have some particulates and/or other constituents filtered out of fluid 1102, may be passed to binary separator 1108. Binary separator 1108, which may be similar to those devices described in FIGS. 2-9 of the present disclosure, may separate filtered fluid 1106 into fluid 1110 and fluid 1112. In an aspect of the present disclosure, fluid 1110 may comprise p-type ions while fluid 1112 may comprise n-type ions.

Fluid 1110 may then be passed to concentrator 1114. Optionally, fluid 1112 may be passed to concentrator 1116. In an aspect of the present disclosure, some embodiments of system 100/1000 may be applied to remove only one type of ions or one specific ionic constituent from fluid 1104. If fluid 1110 comprises the desired constituent and/or constituents, then fluid 1112 can bypass processing in system 100/1000 and be coupled to bypass output 1118 of concentrator 1114 as shown by flow 1120. In an aspect of the present disclosure, bypass output 1118 may be conduit 218 as shown in FIG. 2; in another aspect of the present disclosure, bypass output 1118 may be conduit 202. Other conduit outputs, e.g., conduits 312 and/or 316 as shown in FIG. 3, etc., may also be employed as bypass output 1118 without departing from the scope of the present disclosure.

Referring to concentrator 1114, concentrated fluid 1122, which may contain a concentrated distribution of the desired ionic constituent and/or constituents, may be passed to group separator 1124. Group separator 1124 may be any of the devices described in FIGS. 2-9 of the present disclosure.

Group separator 1124 may separate concentrated fluid 1122 into fluids 1126 and 1128, and/or additional fluids may be output from group separator as described in FIG. 6. Any number of fluids may be output from group separator 1124 without departing from the scope of the present disclosure.

Fluid 1126 may contain Group A ions as described in FIG. 4, and fluid 1128 may comprise Group B elements and/or elements other than Group A elements as described in FIG. 4. Fluid 1126 may contain the ionic constituents from fluid 1102 that are desired as outputs from system 100/1000; as such, fluid 1128 may be sent to bypass fluid 1118 if such desired ionic constituents have been separated from the remainder of the constituents present in fluid 1102. Otherwise, fluid 1128 may be passed to another group separator 1130, for separation into fluids 1132 and 1134. Fluid 1132 may comprise Group B' ions and may be subject to further processing; Fluid 1134 may comprise Group C elements and may be sent to another group separator 1136. If fluid 1134 comprises ionic constituents that are not of interest with respect to the desired outputs of system 100/1000, fluid 1134 may be passed to bypass fluid 1118.

Group A ions, e.g., those in fluid 1126, may be processed in system 100/1000 by passing fluid 1126 to element separator 1138, for separation into different element outputs 1140-1144. A larger or smaller number of outputs 1140-1144 are possible without departing from the scope of the present disclosure. The outputs 1140-1144, either in a single stage or multiple stages of element separators 1138, may then comprise the desired ionic constituent of fluid 1102 without significant contamination from other ionic constituents present in fluid 1102.

In an aspect of the present disclosure, all of outputs 1140-1144, as well as outputs from element separator(s) 1138 coupled to group separators 1130 and/or 1136, as well as bypass 1118, may be outputs from system 100/1000. For example, and not by way of limitation, a fluid 1102 may comprise ionic constituents of lithium, potassium, sodium, chlorine, and calcium. System 100/1000 may be configured to separate the lithium, potassium, sodium and calcium cations from the chlorine anions in binary separator 1108. The chlorine anions may then be present in fluid 1112, and concentrated in concentrator 1116, and output from system 100/1000 as output 1146. The only remaining constituent of fluid 1112 is water, and this may be output from bypass 1148 to bypass output 1150 of system 100/1000.

Concentrator 1114 may concentrate the lithium, potassium, sodium and magnesium cations into fluid 1122, and the bypass fluid 1118 would comprise water, which would be output from bypass fluid 1118 to output 1150. Thus, a purified or deionized water output from system 100/1000 may be present at output 1150.

Group separator 1124 would then separate the lithium, potassium, and sodium (+1) cations from the calcium (+2) ions in fluid 1122. The lithium, potassium, and sodium cations may be present in fluid 1126 and the calcium ions present in fluid 1128. The fluid 1128 can then be output from system 100/1000 as the calcium output.

The lithium, potassium, and sodium cations present in fluid 1126 may be separated by element separator 1138 into output 1140 that comprises lithium, output 1142 that comprises potassium, and output 1144 that comprises sodium. Thus, each output of system 100/1000 can be used if desired. Of course, if one or more of the outputs are not economically feasible to extract from fluid 1102, or if such outputs may require too much further processing in system 100/1000 to extract significant portions, then such outputs may be directed as a "waste", "recycle", or "other processing" output from system 100/1000 if desired without departing from the scope of the present disclosure.

As can be seen, system 100/1000 can be constructed as a "building block" system to allow for separation and concentration of various fluids to isolate one or more desired ionic constituents from an input fluid 1102. Depending on the presence of other ionic constituents in the input fluid, how many ionic constituents are desired as outputs from system 100/1000, and/or other design considerations, the separators, concentrators, and/or other interconnection's may be configured to produce any desired output from system 100/1000 for the input fluid 1102.

Figure 12:
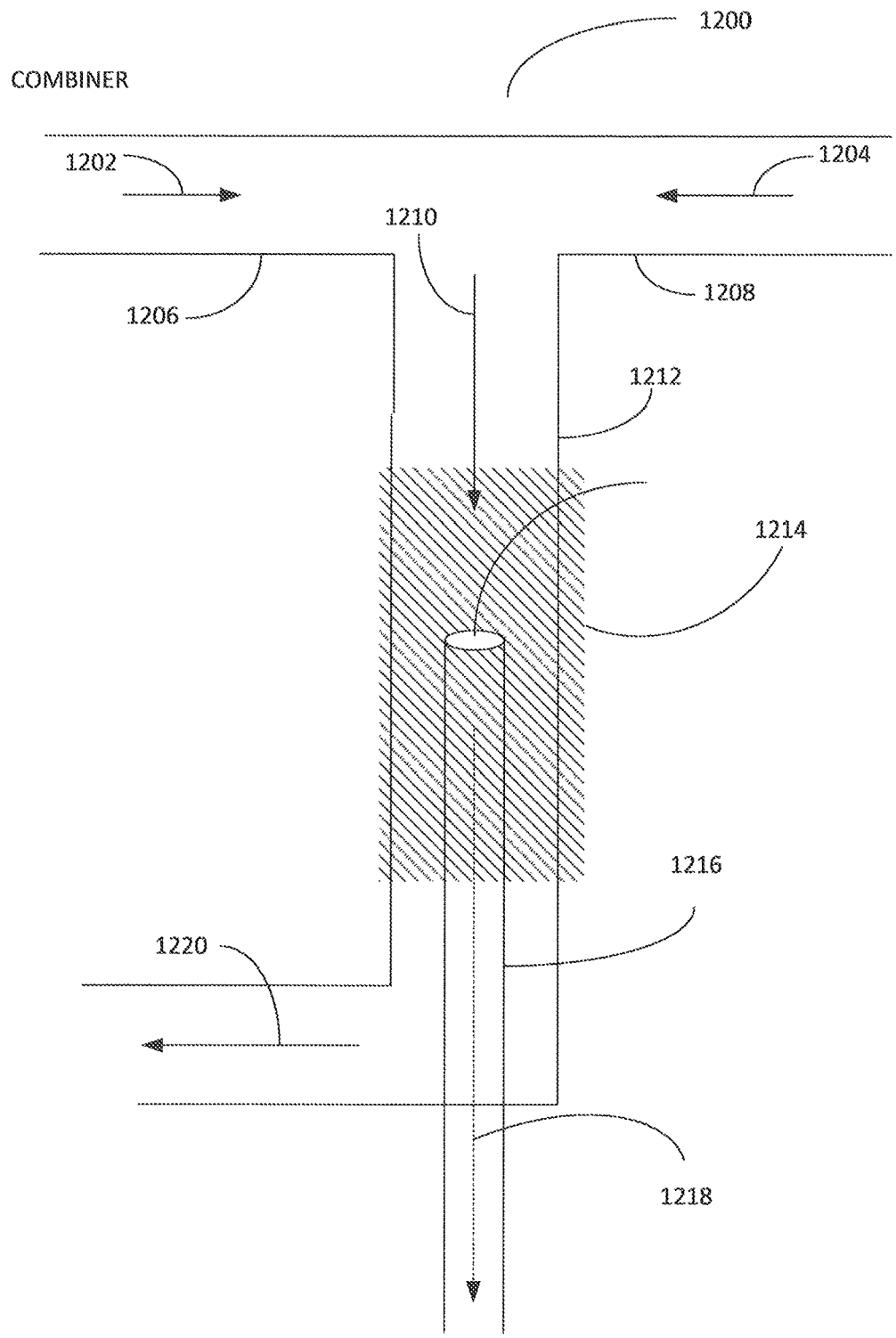
FIG. 12 illustrates a compound combiner in accordance with an aspect of the present disclosure.

FIG. 12 illustrates a combiner in accordance with an aspect of the present disclosure.

Combiner 1200 may be used at any point within system 100/1000. In an aspect of the present disclosure, incoming fluid 1202 and incoming fluid 1204 flow into combiner 1200 in conduits 1206 and 1208, respectively. Incoming fluids 1202/1204 may be any fluid flows described in FIGS. 1-11 without departing from the scope of the present disclosure.

For example, and not by way of limitation, fluid 1202 may be a fluid that has been elementally separated, e.g., comprising lithium cations, and fluid 1204 may be a fluid comprising n-type ions (anions). Because the volume of fluids 1202 and 1204 may be large and/or larger than the saturation point for the concentration of lithium with the anionic constituents of fluid 1204, the lithium may remain ionic and not precipitate from the combined fluids 1202/1204, shown as fluid 1210 in conduit 1212.

In an aspect of the present disclosure, fluid 1210 may be exposed to an electromagnetic field by combiner 1214 such that the ionic components of fluid 1202 and the ionic components of fluid 1204 are concentrated by the combiner 1214. The increased concentration of the ionic components in fluid 1210 are then captured in conduit 1216 as fluid 1218, which may allow for the ionic components to achieve partial and/or complete saturation in fluid 1218. By controlling the strength of the magnetic field, and/or selecting the volume of conduit 1216, and/or other factors, precipitation of various compounds may be possible in an aspect of the present disclosure.

The remaining fluid 1220 can be diverted toward another output of system 100/1000, and/or may be recycled through system 100/1000, and/or may be sent to another separator/concentrator/combiner stage within system 100/1000 as desired. Many possible configurations of combiner 1200 are possible within system 100/1000 without departing from the scope of the present disclosure. Further, combiner 1200 may be configured to be any of the devices described in FIGS. 2-9 without departing from the scope of the present disclosure; for example, one combiner 1200 in system 100/1000 may be an inductive device 902, while another combiner 1200 may be a capacitive device 702 without departing from the scope of the present disclosure.

Figure 13:
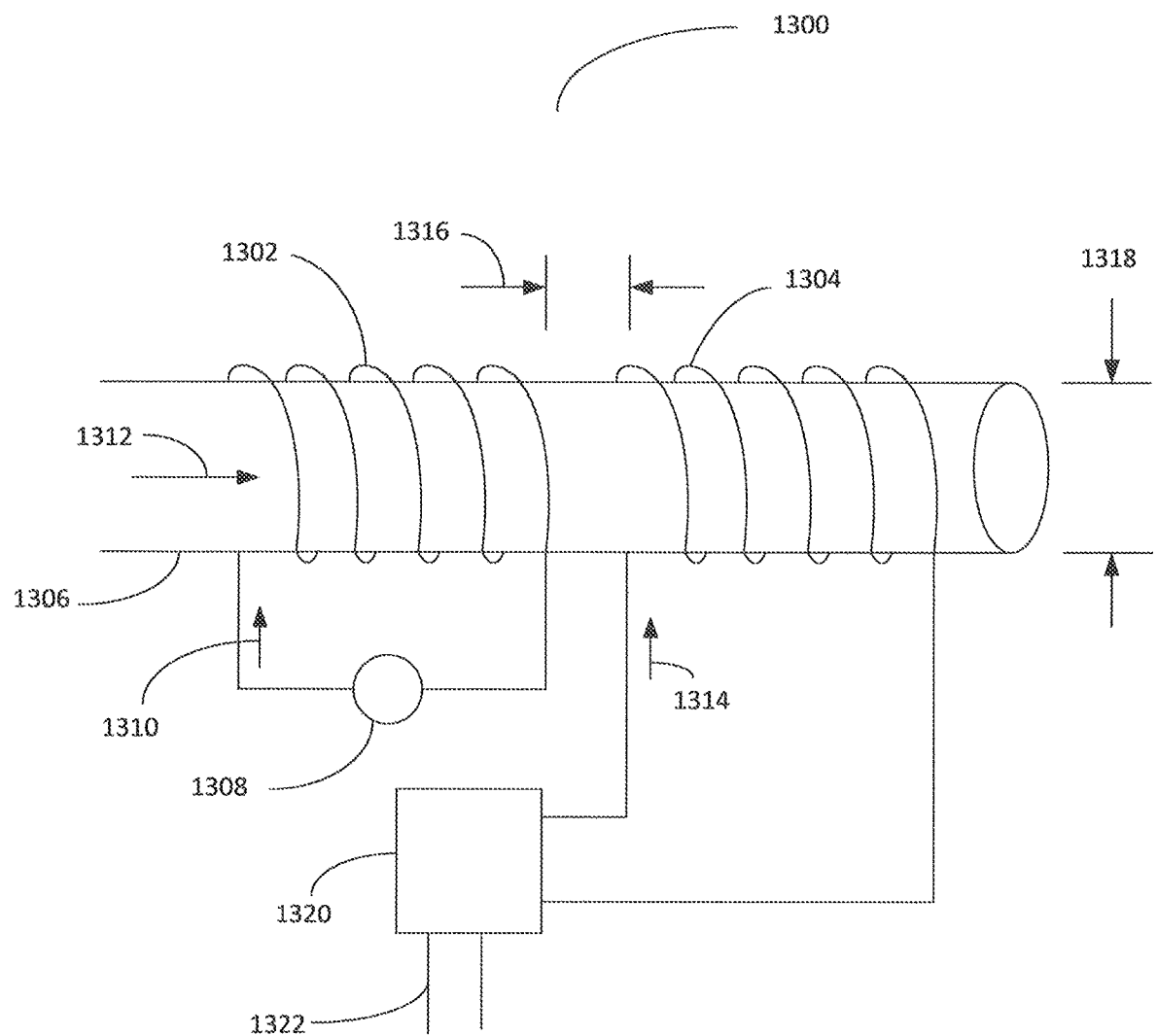
FIG. 13 illustrates an electromagnetic recirculator in accordance with an aspect of the present disclosure.

FIG. 13 illustrates an electromagnetic recirculator in accordance with an aspect of the present disclosure.

As shown in FIG. 13, recirculator 1300 may comprise inductor 1302 and inductor 1304. Inductors 1302 and 1304 are wound around a common core 1306, which may be one or more of the conduits described with respect to FIGS. 2-9. Power source 1308, which may be an alternating current (AC) source, a direct current (DC) source, and/or any other type of power source that can generate a current 1310 in inductor 1302.

When current 1310 is flowing in inductor 1302, a magnetic field is generated around coil 1302. Some of the magnetic field generated by inductor 1302 will affect any materials in core 1306, such as any fluid 1312 flowing in core 1306. Further, some of the magnetic field (also referred to as "magnetic flux") generated by inductor 1302 may pass through inductor 1304, which may induce a current 1314 in coil 1304.

The current 1310 flowing in inductor 1302 "mutually induces" a voltage and current 1314 to flow in inductor 1304. This coupling between inductors 1302 and 1304 is known as "mutual inductance." The amount of mutual inductance that links inductor 1302 to inductor 1304 may depends on the relative positioning of the inductors 1302 and 1304. If inductor 1302 is positioned a small physical distance apart from inductor 1304, then nearly all of the magnetic flux generated by inductor 1302 will interact with the inductor 1304 inducing a relatively large voltage and/or current 1314 across inductor 1304. Such a close coupling between inductors 1302 and 1304 may be referred to as a large mutual inductance value.

The effect of mutual inductance is very much dependent upon the relative spacing 1316 of the two inductors 1302 and 1304. The mutual inductance that exists between the two inductors 1302 and 1304 can be changed by the spacing 1316, the number of turns in inductors 1302 and/or 1304, the material of core 1306, the constituents of fluid 1312, and/or other factors.

For example, and not by way of limitation, if the two inductors 1302 and 1304 are tightly wound one on top of the other over a common soft iron core 1306, losses due to the magnetic flux generated by inductor 1302 that do not pass through inductor 1304 will be reduced. If all of the magnetic flux passes through (or is "linked") between inductors 1302 and 1304, "unity coupling" may be said to exist between inductors 1302 and 1304.

The coupling between inductors 1302 and 1304 in a unity coupling embodiment may be determined by:

$$M = \frac{\mu 0 \mu r N1 N2 A}{l}$$

Where:

μo to is the permeability of free space (4·π·10−7)

μr is the relative permeability of core 1306 (including the permeability of fluid 1312)

N is in the number of turns in each inductor 1302 and 1304

A is in the cross-sectional area 1318 of core 1306 in m2 l is the inductor 1302 and 1304 length in meters

However, the above equation assumes zero flux leakage and 100% magnetic coupling between the two inductors 1302 and 1304. In reality there will always be some loss of magnetic flux due to leakage and position. If some of the total magnetic flux links between the two inductors 1302 and 1304, this amount of flux linkage can be defined as a fraction of the total possible flux linkage between the coils. This fractional value is called the coefficient of coupling and is given the letter k.

Generally, the amount of inductive coupling that exists between the two inductors 1302 and 1304 is expressed as a fractional number between 0 and 1 instead of a percentage (%) value, where 0 indicates zero or no inductive coupling, and 1 indicating full or maximum inductive coupling. In other words, if k=1 the two inductors 1302 and 1304 are perfectly coupled, if k>0.5 the two inductors 1302 and 1304 are said to be tightly coupled and if k<0.5 the two inductors 1302 and 1304 are said to be loosely coupled.

Regardless of the amount of coupling between inductors 1302 and 1304, some amount of current 1314 and voltage will be present on inductor 1304 when inductor 1302 has current 1310 flowing. Thus, when inductor 1302 is being energized as, for example, an electromagnetic concentrator as described herein, the magnetic flux can also be used to generate a current 1314 that can be passed to recirculator 1320.

Recirculator 1320 may then process the current 1314 in such a way that current 1314 can be forwarded to a storage module (e.g., a battery) via output 1322, such that output 1312 can be used to provide primary and/or backup power to power source 1308. Further, current 1314 may be processed and/or conditioned such that output 1322 may be used to provide power to the power grid, similar to how solar panels provide power to the power grid in homes and businesses. For example, and not by way of limitation, power source 1308 may be 115 VAC power from a utility company (via the power grid) that is supplied to recirculator 1300 to energize coil 1302. Output 1322 would return some of the power being used by recirculator 1300 to the power grid, which may reduce the cost of electrical power used by recirculator 1320.

Further, the flow of fluid 1312 may induce an electrical current in both inductor 1302 and 1304, as the ionic constituents of fluid 1312, which each have their own magnetic fields (based on the electric field each ionic constituent comprises) may affect the magnetic field within inductors 1302 and/or 1304. As such, losses in the coupling between inductors 1302 and 1304 may be reduced and/or additional power may be supplied to output 1322.

Recirculator 1320 may be an inverter, a transformer, or other electronic device and/or devices, such that the output 1322 provides a desired output of voltage and/or electrical current. Further, the number of turns in either or both of inductors 1302/1304 can be altered to deliver the desired magnetic flux for concentration of fluid 1312 as described in FIGS. 2-9, the desired mutual inductance between inductors 1302 and 1304, and/or for other purposes without departing from the scope of the present disclosure.

Further, the flow of fluid 1312, when fluid 1312 is an ionic fluid, may induce current in one or more of inductors 1302/1304 without any mutual inductance between inductors 1302 and 1304. For example, and not by way of limitation, when fluid 1312 comprises n-type ions 118 in conduit 312, passing n-type ions 118 through inductor 1302 and/or 1304 (when such inductor 1302 or 1304 surrounds conduit 312) may induce an electrical current in inductor 1302 or 1304. Many locations for inductors 1302 or 1304 within system 100/1000, whether or not mutual inductance exists between inductors 1302 and 1304, are possible without departing from the scope of the present disclosure.

Figure 14:
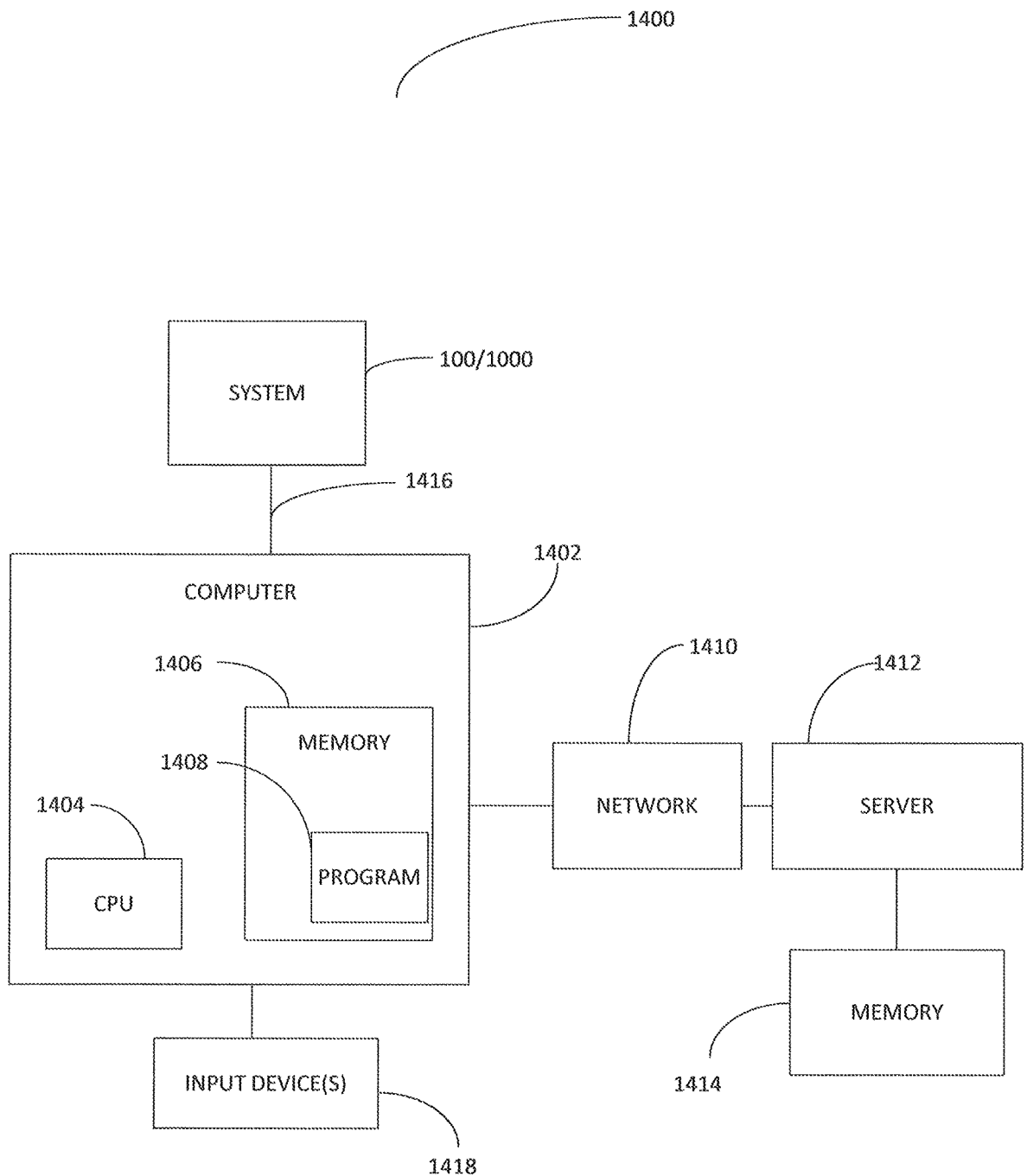
FIG. 14 illustrates a block diagram of a hardware environment in accordance with an aspect of the present disclosure.

FIG. 14 illustrates a block diagram of a hardware environment in accordance with an aspect of the present disclosure.

FIG. 14 is a block diagram that illustrates an example of a hardware environment in an aspect of the present disclosure. A computer system 1400 may employ a computer 1402, which may comprise a central processing unit (CPU) 1404, a memory 1406, and a program 1408. The computer 1402 may be coupled to network 1410, which may be coupled to server 1412 and/or memory 1414, for communication between computer 1402 and other computers 1402 coupled to network 1410, storage of program 1408 on memory 1414, and/or other uses and/or functions of a distributed communications network. Network 1410 may comprise, for example, the internet, Local Area Networks (LANs) Wide Area Networks (WANs), etc., to connect computers 1402 executing, for example, a computer program 1408 that selectively energizes the devices described with respect to FIGS. 2 through 9 such that the fluids described herein may be separated and/or combined as described in various aspects of the present disclosure. Computer 1402 may be a personal computer or work station connected via the Internet 1410 to server computer 1412, other computers 1402, workstations, mini computers, or mainframes.

Computer 1402 may comprise one or more CPUs 1404, various amounts of memory 1406, which may be Random Access Memory (RAM), Read Only Memory (ROM), cache memory, and/or other types of memory that may store one or more computer programs 1408 that may partially and/or fully operate system 100/1000 via connection 1416 with or without inputs from input devices 1418 (e.g., keyboard, computer mouse, etc.). Other programs 1408, such as a web browsing program for accessing information over the Internet, operating systems, etc., may also be stored in memory 1406. Further, computer 1402 and the server computer 1412 may include one or more monitors, display devices, fixed and/or removable data storage devices such as hard disk drives, floppy disk drives, thumb drives, CD-ROM drives, etc.

The computer programs 1408 that may implement one or more functions of the present disclosure are tangibly embodied in a computer-readable medium, e.g., one or more of the fixed and/or removable data storage devices and/or memories 1406/1414 attached to the computer 1402/server 1414. The program(s) 1408 comprises instructions which, when run and executed by the computer 1402, causes the computer 1402 to perform steps that execute the steps or elements of the present disclosure. Generally, these components comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Aspects of the present disclosure may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

It can be seen that many modifications may be made to the hardware environment of FIG. 14 without departing from the scope of the present disclosure. For example, and not by way of limitation, any combination of the above components, or any number of different components, including different logic, data, different peripherals, and different devices, may be used to implement the present disclosure, so long as similar functions are performed thereby. Wireless communications networks may also be employed with the environment of FIG. 14 without departing from the scope of the present disclosure.

Data recorded in the memory 1406, memory 1414, and or program 1408 may specify logic configurations, pattern data, voltages and/or currents for operating devices within system 100/1000, and/or other data. The data may further include logic verification data such as timing diagrams or feedback comparisons for sensors placed within system 100/1000.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory 1406 may be implemented within the processor unit 1404 or external to the processor unit 1404. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Advantages Provided by Embodiments of the Present Disclosure

The present disclosure describes a technological problem that has not been solved in conventional industry practice. Conventional industry practice may use, for example, additive chemical solutions to fluids described in the present disclosure to remove and/or combine various fluid constituents. Other approaches may use electrolysis which requires electrical current to flow through the various fluids described herein. The aspect and/or aspects of the present disclosure described herein does not suffer from these deficiencies, and thus provides an alternative, perhaps less expensive and/or less time-consuming solution to the technological problem of combination and/or removal of various ionic compounds from fluids.

Further, the aspects described in the present disclosure are things that the chemical industry has not been able to obtain. The chemical processing industry has not used electromagnetic fields to separate ionic compounds dissolved in fluids; instead, the chemical processing industry uses chemical additives. The use of electromagnetic fields has not been used, employed, taught, or suggested by the current literature.

The methods, steps, devices, and techniques of the present disclosure, when implemented through the use of a computer as described in FIG. 14, are not steps previously known and merely implemented on a computer. Instead, the aspects of the present disclosure feature not only improvements on technological processes (i.e., the removal and/or combination of ionic constituents in a fluid), the present disclosure provides entirely new methods, devices, and techniques for technological processes that have not been conceived and/or taught in the context of chemical processing.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a view of the device as shown in the present disclosure. Of course, if the device is inverted, above becomes below, and vice versa. Additionally, if oriented sideways, above and below may refer to sides of a device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, and algorithm steps described in connection with the disclosure herein may be implemented as various different types of materials and/or various different combinations of materials. To clearly illustrate this interchangeability, various illustrative components, blocks, modules, and steps have been described above generally in terms of their functionality. The various materials and/or combinations of materials employed to implement the present disclosure depends upon the particular application and design constraints imposed on the overall system. Skilled artisans may implement the described functionality in varying ways for each particular application, but such implementation decisions should not be interpreted as causing a departure from the scope of the present disclosure.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A fluid control device, comprising:
    an outer conduit having a first inlet and a first outlet;
    an inner conduit, internal to the outer conduit, having a second inlet which is internal to the outer conduit and a second outlet distinct from the first outlet and in parallel with the first outlet; and
    an electromagnetic field generating device, externally coupled to the outer conduit, in which the electromagnetic field generating device creates an electromagnetic field within the outer conduit and proximate at least a portion of the inner conduit that includes the second inlet, such that ions within a fluid flowing into the first inlet in the outer conduit toward the second inlet and toward the first outlet and second outlet are affected by the electromagnetic field; in which at least a portion of the ions within the fluid flowing into the first inlet in the outer conduit are concentrated to flow into the second inlet and through the inner conduit such that a first concentration of the ions in the fluid flowing from the first outlet is less than a second concentration of the ions in the fluid flowing from the second outlet.

2. The fluid control device of claim 1, in which a flow of the fluid in the outer conduit moves the ions in the fluid toward the second inlet.

3. The fluid control device of claim 1, in which the electromagnetic field generating device is a coiled wire, such that the coiled wire is coiled around an outside of the outer conduit.

4. The fluid control device of claim 3, in which the coiled wire is electrically insulated from the outer conduit.

5. The fluid control device of claim 4, in which second inlet encompasses an axial center of the coiled wire.

6. The fluid control device of claim 5, in which the second inlet is located between a first turn of the coiled wire that is coiled around the outside of the outer conduit and a last turn of the coiled wire that is coiled around the outside of the outer conduit.

7. The fluid control device of claim 1, in which the electromagnetic field generating device is a capacitive device coupled around an outside of the outer conduit.

8. The fluid control device of claim 7, in which the capacitive device is electrically insulated from the outer conduit.

9. The fluid control device of claim 4, in which the second inlet encompasses an axial portion of the capacitive device.

10. The fluid control device of claim 4, in which the second inlet is located between a first plate of the capacitive device that is coupled around the outside of the outer conduit and a second plate of the capacitive device that is coupled around the outside of the outer conduit.

11. A method for selectively moving ions in a fluid, comprising:
    flowing the fluid in a first conduit having a first outlet;
    simultaneously flowing the fluid in a second conduit, where the second conduit is internal to the first conduit, the second conduit having a second outlet in parallel with the first outlet;
    exposing the fluid flowing in the first conduit to an electromagnetic field, wherein the electromagnetic field is generated external to the first conduit;
    adjusting the electromagnetic field to selectively affect at least one ion in the fluid flowing in the first conduit; and
    arranging the electromagnetic field with respect to the first conduit and the second conduit such that a first concentration of the ions in the fluid flowing from the first outlet is less than a second concentration of the ions in the fluid flowing from the second outlet.

* * * * *